(12) United States Patent
Deguchi et al.

(10) Patent No.: US 7,611,762 B2
(45) Date of Patent: *Nov. 3, 2009

(54) OPTICAL RECORDING MEDIUM

(75) Inventors: Hiroshi Deguchi, Kanagawa (JP);
Hajime Yuzurihara, Kanagawa (JP);
Eiko Hibino, Kanagawa (JP); Hiroshi Miura, Kanagawa (JP); Mikiko Abe, Kanagawa (JP); Shinya Narumi, Kanagawa (JP); Takeshi Kibe, Kanagawa (JP); Katsuyuki Yamada, Kanagawa (JP); Satoshi Taniguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 100 days.

This patent is subject to a terminal disclaimer.

(21) Appl. No.: 11/397,551

(22) Filed: Apr. 5, 2006

(65) Prior Publication Data

US 2006/0183052 A1    Aug. 17, 2006

Related U.S. Application Data

(63) Continuation of application No. 10/660,564, filed on Sep. 12, 2003, now Pat. No. 7,063,875.

(30) Foreign Application Priority Data

| Sep. 13, 2002 | (JP) | 2002-268073 |
| Oct. 18, 2002 | (JP) | 2002-304678 |
| Jan. 14, 2003 | (JP) | 2003-006246 |
| Jan. 23, 2003 | (JP) | 2003-014421 |
| Jul. 29, 2003 | (JP) | 2003-203216 |

(51) Int. Cl.
*B32B 3/02* (2006.01)

(52) U.S. Cl. .................. 428/64.4; 428/64.5; 430/270.13

(58) Field of Classification Search ................ 428/64.4; 430/270.13
See application file for complete search history.

(56) References Cited

U.S. PATENT DOCUMENTS

| 6,280,810 B1 | 8/2001 | Nakamura et al. |
| 6,445,669 B1 | 9/2002 | Hattori et al. |
| 6,479,121 B1 | 11/2002 | Miura et al. |
| 6,548,137 B2 | 4/2003 | Ito et al. |

(Continued)

FOREIGN PATENT DOCUMENTS

EP    1 158 506 A1    11/2001

(Continued)

*Primary Examiner*—Elizabeth Mulvaney
(74) *Attorney, Agent, or Firm*—Dickstein Shapiro LLP

(57) ABSTRACT

An optical disc having a transition linear velocity of 8-11 m/s when irradiating continuous light with 11±1 mW and a wavelength of 660±10 nm using a pickup head with a numerical aperture (NA) of 0.65, and satisfying the following condition:

$$\Delta R = |Rb - Ra| \leq 3\%$$

where Rb is a reflectance of an unrecorded area, and Ra is a reflectance of the top of an eye pattern after ten cycles of recording. In one recording mode therefor, the disc is rotated at a constant angular velocity so as to have a linear velocity of 3-4 m/s on an innermost track and a linear velocity of 8-9 m/s on an outermost track. In another mode, the disc is rotated at a constant angular velocity so as to have a linear velocity of 5-6 m/s on an innermost track and a linear velocity of 13-14 m/s on an outermost track.

17 Claims, 18 Drawing Sheets

U.S. PATENT DOCUMENTS

| | | |
|---|---|---|
| 6,703,098 B2 | 3/2004 | Hirotsune et al. |
| 6,709,801 B2 | 3/2004 | Miyamoto et al. |
| 6,775,226 B1 | 8/2004 | Miyamoto et al. |
| 6,827,999 B2 | 12/2004 | Ito et al. |
| 2001/0017833 A1 | 8/2001 | Yamada et al. |
| 2001/0041240 A1 | 11/2001 | Ito et al. |
| 2002/0075789 A1 | 6/2002 | Katoh et al. |
| 2002/0098445 A1 | 7/2002 | Harigaya et al. |
| 2002/0110063 A1 | 8/2002 | Yamada et al. |
| 2002/0145963 A1 | 10/2002 | Narumi et al. |
| 2002/0155248 A1 | 10/2002 | Ito et al. |
| 2002/0160306 A1 | 10/2002 | Hanaoka et al. |
| 2003/0003395 A1 | 1/2003 | Yuzurihara et al. |
| 2003/0008236 A1 | 1/2003 | Yamada et al. |
| 2003/0012917 A1 | 1/2003 | Harigaya et al. |
| 2003/0044719 A1 | 3/2003 | Katoh et al. |
| 2003/0214888 A1 | 11/2003 | Kato et al. |
| 2003/0214902 A1 | 11/2003 | Yamada et al. |
| 2004/0017768 A1 | 1/2004 | Hibino et al. |
| 2004/0076099 A1 | 4/2004 | Yuzurihara et al. |
| 2004/0114488 A1 | 6/2004 | Sawada et al. |
| 2004/0115559 A1 | 6/2004 | Kato et al. |
| 2004/0161700 A1 | 8/2004 | Abe et al. |

FOREIGN PATENT DOCUMENTS

| | | |
|---|---|---|
| EP | 1 223 577 A2 | 7/2002 |
| JP | 11-288526 | 10/1999 |
| JP | 2000-222777 | 8/2000 |
| JP | 2002-237096 | 8/2002 |
| JP | 2002-245663 | 8/2002 |
| JP | 2004-046956 | 2/2004 |
| JP | 2004-276583 | 10/2004 |
| WO | WO 01/13370 A1 | 2/2001 |

FIG. 6A
FIG. 6B
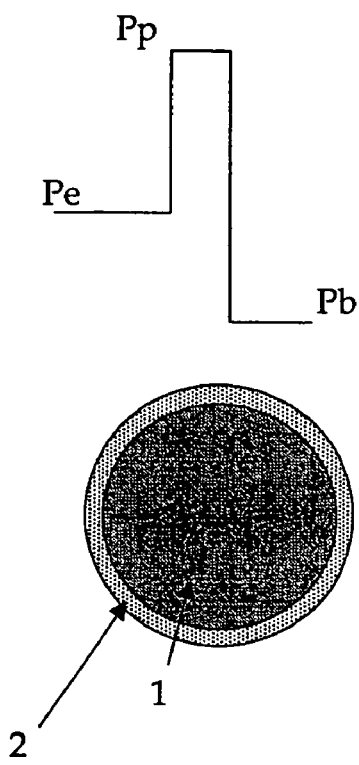
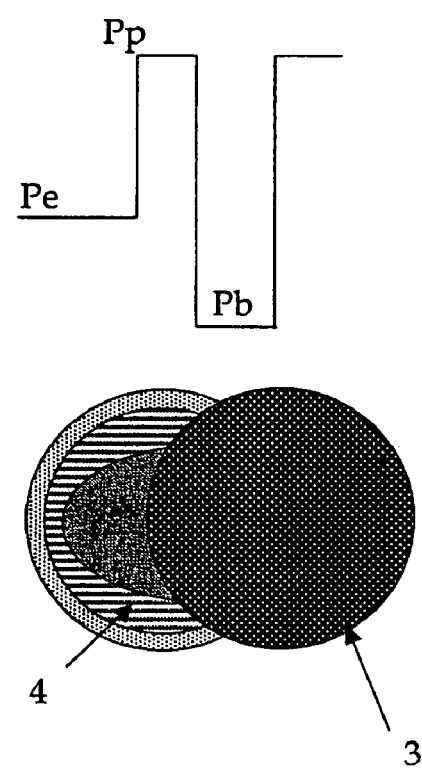

OPTICAL RECORDING MEDIUM

This is a continuation application of U.S. patent application Ser. No. 10/660,564, filed on Sep. 12, 2003, the entire disclosure of which is incorporated by reference herein.

BACKGROUND OF THE INVENTION

1. Field of the Invention

The present invention relates to phase-change optical recording media recordable and reproducible over a broad range of linear velocities.

2. Description of the Related Art

An example of phase-change optical recording media having high compatibility in reproduction by DVD-ROM drives can be found in Japanese Patent Application Laid-Open (JP-A) No. 2002-237096. However, this optical recording medium does not take high-velocity recording and good downward compatibility (compatibility in recording at low linear velocity) into consideration.

Examples of means for achieving satisfactory recording at high velocity can be found in Japanese Patent (JP-B) No. 3150267, JP-A Nos. 2001-56958 and 2002-96560, in which the composition of a recording layer is specified to one suitable for high-velocity recording; in JP-A Nos. 2002-237095, 06-195747, 11-339314, 2001-167475 and 2002-222543, in which a layer mainly aiming to accelerate crystallization is arranged adjacent to a recording layer; and in JP-A Nos. 2002-100075 and 2002-237088, in which a reflective layer comprising Ag or an Ag alloy is provided. These optical recording media are intended to achieve high-velocity recording by increasing the crystallization rate of the recording layer. However, these techniques alone cannot provide optical recording media capable of high-velocity recording and having good downward compatibility as in the present invention.

JP-A No. 2002-190138 discloses an optical recording medium having two upper protective layers. This optical recording medium may have good overwrite properties over a broad range of linear velocities but does not take downward compatibility into consideration.

JP-A No. 2002-245663 discloses an optical recording medium recordable at linear velocities ranging from 1.2 to 30 m/s. This optical recording medium is recordable at high velocity but does not take downstream compatibility into consideration.

DVD+RW medium is a kind of phase-change optical recording media, on which recording can be performed repeatedly, and which have high compatibility with DVD-ROM. They are specified in "DVD+RW 4.7 G bytes Basic Format Specifications System Description" and are practically used as recording media for dynamic images or external archival media for personal computers.

In a phase-change optical recording medium, a thin film of recording layer on a substrate is heated by the irradiation with a laser light, the recording layer thereby undergoes phase change between a crystalline phase and an amorphous phase. Thus, the reflectance of the medium is changed to thereby record and erase information on the medium. In general, the recording layer before recording is configured to have a crystalline phase having a high reflectance. A recording is produced by forming a mark of an amorphous phase having a low reflectance and a space of a crystalline phase having a high reflectance. A method of repeated recording employed in DVD+RW is shown in FIGS. 1 and 2.

In this method, a recording pulse pattern is used in which a laser power—is modulated at three power levels of a peak power Pp, an erasing power Pe, and a bias power Pb (Pp>Pe>Pb). Upon irradiation of a laser light which is pulsed with a pulse train consisting of Pp and Pb, the recording layer undergoes fusing and quenching multiple times to thereby form an amorphous mark. Upon irradiation with Pe, the recording layer is gradually cooled to thereby form a space.

In the case of recording on DVD+RW media, four parameters, dTtop, Ttop, Tmp, and dTera shown in FIG. 1 specify a recording pulse pattern. Herein T is a reference clock; a pulse train between the front and rear of the pulse train consisting of Pp and Pb is referred to as a "multipulse" and is arranged with a cycle of 1T; dTtop is a front pulse starting time, Ttop is a width of the front pulse; Tmp is a width of a peak power pulse in the multipulse; Tw is a width of the reference clock; and dTera is an erase-starting time.

DVD+RW media is recordable and reproducible at 1× to 2.4× speed (3.49 to 8.44 m/s). To achieve higher capacity data archival, demands have been made on media that is reproducible at higher velocity. As described in the aforementioned patent documents, media which is recordable at high velocity are generally obtained by specifying the composition of a recording layer or by providing a layer for accelerating crystallization adjacent to the recording layer to thereby increase the crystallization rate of the recording layer. However, when the crystallization rate of the recording layer is increased, a record is not satisfactorily produced unless a higher recording power is used or a recording pulse wave pattern out of the multipulse of 1T period is used. Accordingly, when a drive recordable at 1× to 2.4× speed with a maximum recording power of 15 mW is used on these media, records cannot be produced thereon due to insufficient power. In addition, firmware alone cannot significantly change the recording pulse pattern.

Generally, a phase-change optical medium comprises a transparent plastic substrate, a specific groove formed on the substrate, and a thin film arranged thereon. A polycarbonate is generally used as a material for the plastic substrate, and the groove is often formed by injection molding. The thin film formed on the substrate is a multilayer film basically comprising a lower protective layer, a recording layer, an upper protective layer, and a reflective layer formed on the substrate in this order. The lower and upper protective layers comprise, for example, an oxide, a nitride, or a sulfide, of which a mixture of ZnS and $SiO_2$ is often used. The recording layer often comprises a phase-change material mainly comprising SbTe. Such phase-change materials include, for example, Ge—Sb—Te, In—Sb—Te, Ag—In—Sb—Te, Ge—In—Sb—Te, Ge—Sn—Sb—Te, and the like. The reflective layer generally comprises a metallic material, of which Al, Ag, Au, Cu, other metals, or an alloy of these metals is preferably used for their good optical properties and thermal conductivity.

The multilayer film can be prepared by any technique such as resistance heating, electron beam vapor deposition, sputtering, and chemical vapor deposition (CVD) and the like. Among these techniques, sputtering is often employed for high mass productivity thereof. For protecting the thin multilayer film, a resin layer is formed thereon by spin coating.

Arbitrary amorphous marks can be formed on the resulting phase-change optical medium by irradiating the medium with an optionally determined laser emitting pattern (hereinafter referred to as "strategy"). These phase-change optical media are capable of direct overwrite (hereinafter briefly referred to as "DOW") recording in which erasing and recording procedures are performed at a time.

The term "erasing" as used herein means crystallization of an amorphous mark, and the term "recording" means conversion of a crystal into an amorphous mark.

A strategy often used is a control of three-power levels: a peak power Pp, an erasing power Pe, and a bias power Pb (Pp>Pe>Pb). A mark having an optional length is recorded by employing these parameters and various pulse widths in combination.

As a modulation system of recording and reproducing of data, eight to fourteen modulation (EFM) and EFM plus (EFM+) modulation are used in CDs and DVDs, respectively. These modulation systems are mark edge recording systems, in which control of the mark length is very important. The control of the mark length is generally evaluated based on jitter properties.

These phase-change media are widely used as rewritable DVD media such as DVD-RAM, DVD-RW, and DVD+RW. The three types of DVD media have a recording capacity of 4.7 GB but have different recording linear velocities. The DVD+RW media can be used in a constant angular velocity (CAV) system and are recordable at linear velocity ranging from 3.49 to 8.44 m/s. This means that the DVD+RW media can be recorded in a constant linear velocity system at a linear velocity of 8.44 m/s, which linear velocity is higher than those in the other systems. In general, the recording linear velocity is proportional to the data recording velocity, and the DVD+RW media can produce data records in a shorter recording time than the other systems. To produce data records in a shorter recording time, media that are recordable at a higher linear velocity have been developed in the individual systems in recent years.

To record data at a higher linear velocity (high-velocity recording), the composition of the phase-change material in the recording layer plays an important role. Above all, it is essential to increase the recrystallization critical velocity of the phase-change material.

The "recrystallization critical velocity" as used herein is defined in the following manner.

A phase-change optical media is irradiated with DC light at a constant laser power while tracking at an optionally varying rotational linear velocity, and a change in reflectance in this procedure is determined. The laser power used herein is sufficient to fuse the phase-change material. FIG. 3 illustrates an example of the result, in which the reflectance sharply drops at a rotational linear velocity of around 5 m/s. Such a phase-change material is so designed that the reflectance in a crystalline phase is higher than that in an amorphous phase, and the phase-change material is thereby not converted into the crystalline phase, namely is not recrystallized, at a rotational linear velocity of 5 m/s or more. This critical rotational linear velocity is defined as the recrystallization critical velocity.

If the recrystallization critical velocity is lower than the recording linear velocity, the phase-change material is not sufficiently crystallized in overwriting, and the produced records are not sufficiently erased. In particular, the present inventors have confirmed by experiment that jitter significantly increases in a first overwriting (hereinafter briefly referred to as "DOW1").

When the recrystallization critical velocity is increased, the resulting medium will have markedly deteriorated archival stability and reliability. To avoid these problems, Ge or N is incorporated into the phase-change material as disclosed in JP-A Nos. 2000-229478 and 2001-199166. However, the present inventors have verified by experiments that the recrystallization critical velocity is decreased by addition of these elements in proportion to their amounts. At some set recrystallization critical velocities, these elements may not be added in sufficient amounts to improve the archival stability and reliability.

The optical recording media should preferably be recorded at low linear velocities as well as high linear velocities, for achieving compatibility with optical medium drives already commercially available, i.e., for achieving "downward compatibility". When an optical recording medium that can be used at a high linear velocity is used at a low linear velocity, heat generated as a result of laser irradiation readily accumulates in the recording layer. In addition, the phase-change material has a high recrystallization critical velocity. For these reasons, the phase-change material is markedly recrystallized and becomes resistant to conversion into an amorphous phase. To avoid this problem, the optical recording medium must have a "quenching" layer structure that can highly effectively dissipate heat. In addition, the minimum power Pb must have a longer pulse width and Pp must have a shorter pulse width in the strategy of laser. By employing these configurations, the generated heat can be rapidly dissipated, and the phase-change material can become amorphous. However, these configurations invite an increased recording power necessary to raise the phase-change material to a temperature at which the phase change occurs, and the resulting medium may not have satisfactory downward compatibility due to insufficient power.

In addition to the aforementioned techniques, JP-A No. 08-267926 discloses an optical disc having a specific composition of AgInSbTeGe and having high reliability in recording at high linear velocity; JP-A No. 2000-229478 discloses an optical recording medium which has a specific composition of AgInSbTeGe, is recordable with stable dimensions of fine marks of 350 nm or less and can exhibit excellent thermal stability; JP-A No. 2000-322740 discloses an optical recording medium which has a specific composition of AgInSbTeGe and is recordable and reproducible over a wide range of linear velocities; JP-A No. 2001-199166 discloses an optical disc which has a specific composition of AgInSbTeGe and has excellent overwriting properties; JP-A No. 2001-283462 discloses an optical disc which has a specific composition of AgInSbTeGe, exhibits less optical deterioration in reproduction, has good archival reliability and satisfactory sensitivity; JP-A No. 2002-103810 discloses an optical disc which has a specific composition of AgInSbTeGe, can satisfactorily overwrite at high velocity, exhibits less optical deterioration in reproduction and has satisfactory archival reliability; JP-A No. 2002-205459 discloses an optical recording medium which has a specific composition of AgInSbTeGe and is recordable and reproducible over a wide range of linear velocities.

However, these techniques do not teach improvement in overwriting properties, in particular at DOW1, and improvement in recording linear velocity and recording sensitivity. The optical recording media disclosed in JP-A Nos. 08-267926 and 2002-205459 have a recording density lower than that in the present invention, and the media disclosed in JP-A Nos. 2001-199166 and 2002-103810 can be applied only to recording at linear velocities within a narrower range than the present invention.

International Publication No. WO/97-32304 discloses an optical disc having an interfacial reflection control layer arranged above and below a recording layer and thereby having controlled optical properties for higher recording density. However, concrete materials for, and an intended purpose of, the interfacial reflection control layer are different from those in the present invention.

JP-A No. 2000-182277 discloses an optical disc having an absorption compensation layer and an interfacial layer and thereby having improved disc properties. However, concrete materials and configurations of these layers are different from those in the present invention.

JP-A Nos. 2000-348380 and 2001-006213 disclose optical discs having a transparent dielectric layer (interface layer) mainly comprising an oxide having a refractive index of 1.5 or more and zinc sulfide, and thereby having improved properties. However, concrete materials and configurations of these layers are different from those in the present invention.

JP-A No. 2002-04739 discloses an optical disc having an absorption compensation layer and an interfacial layer to thereby improve disc properties. However, concrete materials and configurations of these layers are different from those in the present invention.

JP-A No. 11-339314 discloses an optical disc having an oxide layer between a first dielectric layer (interface layer) and a recording layer to improve disc properties. However, concrete materials and thickness of the layers are different from those in the present invention.

SUMMARY OF THE INVENTION

Accordingly, an object of the present invention is to provide an optical recording medium which has high compatibility with DVD-ROM, has excellent archival stability, can satisfactorily be recorded repeatedly at least at 4× speed (14 m/s) and can satisfactorily be recorded at 1× to 2.4× speed with a recording power of 15 mW or less in a recording pulse pattern using a multi-pulse in a cycle of 1T.

Another object of the present invention is to provide an optical recording medium which has excellent DOW properties, can inhibit increased jitters in DOW1 and has excellent archival reliability.

Specifically, the present invention provides, in an aspect, an optical recording medium including at least an optically transparent substrate; a lower protective layer; a recording layer containing a phase-change material; an upper protective layer, the lower protective layer, the recording layer, and the upper protective layer being arranged on the optically transparent substrate in this order; and an interfacial layer arranged at least one of between the recording layer and the lower protective layer and between the recording layer and the upper protective layer, wherein the optical recording medium has a transition linear velocity ranging from 8 to 11 m/s as determined by irradiating continuous light with a power of 11±1 mW and a wavelength of 660±10 nm using a pickup head with a numerical aperture (NA) of 0.65 and satisfies the following condition:

$$\Delta R = |Rb - Ra| \leq 3\%$$

wherein $\Delta R$ is an absolute value of the difference between Ra and Rb; Rb is a reflectance of an unrecorded area, and Ra is a reflectance of the top of an eye pattern after ten cycles of recording, wherein the optical recording medium is recordable at least both in a first recording mode and in a second recording mode, wherein in the first recording mode, the optical recording medium is rotated at a constant angular velocity so as to have a linear velocity of 3 to 4 m/s in recording on an innermost track and to have a linear velocity of 8 to 9 m/s in recording on an outermost track, and in the second recording mode, the optical recording medium is rotated at a constant angular velocity so as to have a linear velocity of 5 to 6 m/s in recording on an innermost track and to have a linear velocity of 13 to 14 m/s in recording on an outermost track.

Preferably, the optical recording medium further includes a sulfuration-inhibiting layer and a reflective layer arranged on the upper protective layer in this order; and a wobbled groove arranged on the optically transparent substrate, the wobbled groove has a track pitch of 0.74±0.03 μm, a groove depth of 22 nm to 40 nm, and a groove width of 0.17 μm to 0.30 μm, the lower protective layer includes a mixture of ZnS and $SiO_2$, the phase-change material in the recording layer mainly includes Sb and Te, the upper protective layer includes a mixture of ZnS and $SiO_2$, the sulfuration-inhibiting layer includes at least one of Si and SiC, and the reflective layer includes at least one of Ag and Ag alloys. The lower protective layer preferably has a thickness of 40 nm to 220 nm. The upper protective layer preferably has a thickness of 2 nm to 20 nm. Preferably, the phase-change material in the recording layer has an atomic ratio [Sb/(Sb+Te)] of Sb to the total of Sb and Te of 0.74 to 0.85, the phase-change material further includes at least one selected from the group consisting of Ag, In, and Ge, the atomic ratio of the total of Ag, In, and Ge to the total atoms in the phase-change material is from 0.04 to 0.10, and the atomic ratios of Ag, In, and Ge to the total atoms in the phase-change material satisfy the following conditions: $0 \leq Ag \leq 0.01$, $0.02 \leq In \leq 0.06$, and $0.02 \leq Ge \leq 0.06$. It is preferred that the phase-change material in the recording layer further includes at least one selected from the group consisting of Ag, In, and Ge, the phase-change material has an atomic composition satisfying the following conditions: $0 \leq Ag \leq 0.015$, $0.010 \leq In \leq 0.080$, $0.600 \leq Sb \leq 0.800$, $0.100 \leq Te \leq 0.300$, and $0.010 \leq Ge \leq 0.080$, the atomic ratio of the total of Ag, In, and Ge to the total atoms in the phase-change material is from 0.050 to 0.090, and the atomic ratio [Ag/(Ag+In+Ge)] of Ag to the total of Ag, In, and Ge in the phase-change material is 0.10 or less. The optical recording medium preferably satisfies the following condition: $3.5 \leq [Rmaxv - RCv] \leq 5$, wherein RCv is a recrystallization critical velocity (m/s) of the recording layer; and Rmaxv is a maximum recording linear velocity (m/s) of the recording layer. The recording layer preferably has a thickness of 8 nm to 22 nm. The reflective layer preferably has a thickness of 90 nm to 200 nm. The sulfuration-inhibiting layer preferably has a thickness of 3 nm to 22 nm. It is preferred that the interfacial layer includes at least one oxide selected from the group consisting of $ZrO_2$, $TiO_2$, $SiO_2$, $Al_2O_3$, and $Ta_2O_5$. More preferably, the interfacial layer includes $ZrO_2$, $TiO_2$, and at least one selected from the group consisting of rare-earth metal oxides and oxides of Group IIa elements of the Periodic Table of Elements except Be and Ra. The at least one selected from the group consisting of rare-earth metal oxides and oxides of Group IIa elements of the Periodic Table of Elements except Be and Ra is preferably contained in the interfacial layer in an amount of 1 mol % to 10 mol % relative to $ZrO_2$. $TiO_2$ is preferably contained in the interfacial layer in an amount of 10 mol % to 50 mol % of the total oxides. The interfacial layer preferably has a thickness of 1 nm to 22 nm.

Additionally, preferable aspects of the present invention are as follows.

1) An optical recording medium comprises: a transparent substrate has a wobbled groove thereon in which a track pitch is 0.74±0.03 μm, a groove depth is 22 nm to 40 nm, and a groove width is 0.17 μm to 0.30 μm; a lower protective layer formed of a mixture of ZnS and $SiO_2$, disposed above the transparent substrate; a recording layer containing Ag, In, Sb, Te and Ge, disposed above the lower protective layer; an upper protective layer formed of a mixture of ZnS and $SiO_2$, disposed above the recording layer; a sulfuration-inhibiting layer formed of SiC, Si, or the material consisting the same as a main component, disposed above the upper protective layer;

a reflective layer formed of Ag or Ag alloy disposed above the sulfuration-inhibiting layer; and a interface layer formed of oxides, disposed one of or both of between the recording layer and the lower protective layer, and between the recording layer and the upper protective layer, in which the optical recording medium has a transition linear velocity ranging from 8 m/s to 11 m/s as determined by irradiating continuous light with a power of 11±1 mW and a wavelength of 660±10 nm using a pickup head with a numerical aperture (NA) of 0.65, and satisfies the following condition:

$$\Delta R = |Rb - Ra| \leq 3\%$$

where ΔR is an absolute value of the difference between Ra and Rb; Rb is a reflectance of an unrecorded area, and Ra is a reflectance of the top of an eye pattern after ten cycles of recording.

2) An optical recording medium according to 1), wherein the lower protective layer has a thickness of 40 nm to 220 nm.

3) An optical recording medium according to any one of 1) and 2), wherein the upper protective layer has a thickness of 2 nm to 20 nm.

4) An optical recording medium according to any one of 1) to 3), wherein the recording layer has an atomic ratio [Sb/(Sb+Te)] of Sb to the total of Sb and Te of 0.74 to 0.79, the total content of Ag, In, and Ge in the recording layer is 4% by atom to 10% by atom, and each content of Ag, In, and Ge in the phase-change material is:

$$0.1 \leq Ag \leq 1, 2 \leq In \leq 6, \text{ and } 2 \leq Ge \leq 6.$$

where each number refers to percentage per atom.

5) An optical recording medium according to any of 1) to 4), wherein the recording layer has a thickness of 8 nm to 22 nm.

6) An optical recording medium according to any of 1) to 5), wherein the reflective layer has a thickness of 90 nm to 200 nm.

7) An optical recording medium according to any one of 1) to 6), wherein the sulfuration-inhibiting layer has a thickness of 3 nm to 22 nm.

8) An optical recording medium according to any one of 1) to 7), wherein the interface layer contains at least one type of oxides selected from $ZrO_2$, $TiO_2$, $SiO_2$, $Al_2O_3$, and $Ta_2O_5$.

9) An optical recording medium according to any one of 1) to 8), wherein the interface layer has a thickness of 1 nm to 20 nm.

<1> An optical recording medium comprising: a transparent substrate; a lower protective layer; a recording layer; upper protective layer; and reflective layer, wherein the recording layer contains a phase-change material having an atomic composition expressed by the following composition formula:

$$Ag_a In_b Sb_x Te_y Ge_c,$$

$$0 \leq a \leq 0.015$$

$$010 \leq b \leq 0.080$$

$$0.600 \leq x \leq 0.800$$

$$0.100 \leq y \leq 0.300$$

$$0.010 \leq c \leq 0.080$$

$$0.050 \leq a+b+c \leq 0.090$$

$$a/(a+b+c) \leq 0.10$$

where a, b, x, y, and c are atomic ratio, and satisfies following condition:

$$a+b+x+y+c=1.$$

<2> An optical recording medium according to <1>, wherein the phase-change material satisfies the following conditions:

$$0.001 \leq a \leq 0.015$$

$$0.060 \leq a+b+c \leq 0.080.$$

<3> An optical recording medium according to <2>, wherein the phase-change material satisfies the following condition:

$$0.065 \leq a+b+c \leq 0.075.$$

<4> An optical recording medium according to any one of <1> to <3>, wherein the phase-change material satisfies the following condition:

$$0.75 \leq x/(x+y) \leq 0.85.$$

<5> An optical recording medium according to any one of <1> to <4>, wherein the phase-change material satisfies the following condition:

$$3.5 < [Rmaxv - RCv] < 5$$

where RCv is a recrystallization critical velocity (m/s) of the recording layer; and Rmaxv is a maximum recording linear velocity (m/s) of the recording layer.

<6> An optical recording medium according to any one of <1> to <5>, further comprising a dielectric layer (interface layer) formed of an oxide material, disposed between the recording layer and the upper protective layer and/or between the recording layer and the lower protective layer.

<7> An optical recording medium according to <6>, wherein the oxide material contains $ZrO_2$ and $TiO_2$.

<8> An optical recording medium according to <7>, wherein the oxide material is at least one selected from and oxides of Group IIa elements of the Periodic Table of Elements except Be and Ra.

<9> An optical recording medium according to <8>, wherein the at least one selected from rare-earth metal oxides and oxides of Group IIa elements of the Periodic Table of Elements except Be is contained in an amount of 1 mol % to 10 mol % relative to $ZrO_2$.

<10> An optical recording medium according to any one of <7> to <9>, wherein $TiO_2$ is contained in an amount of 10 mol % to 50 mol % of the total oxide material.

<11> An optical recording medium according to any one of <6> to <10>, wherein the dielectric layer (interface layer) has a thickness of 2 nm to 5 nm.

<12> An optical recording medium according to any one of <1> to <11>, wherein the lower protective layer has a thickness of 40 nm to 80 nm, the recording layer has a thickness of 5 nm to 29 nm, the upper protective layer has a thickness of 5 nm to 20 nm, and the reflective layer has a thickness of 100 nm to 200 nm.

<13> An optical recording medium according to any one of <1> to <12>, wherein the transparent substrate has a wobbled groove thereon in which a track pitch is 0.74±0.03 μm, a groove depth is 22 nm to 40 nm, and a groove width is 0.2 μm to 0.4 μm.

<14> An optical recording medium according to any one of <1> to <13>, wherein the optical recording medium is recordable with at least two recording modes of a fires recording mode and a second recording mode, in which the first recording mode is that the optical recording medium is rotated at a constant angular velocity so as to have a linear velocity of 3 m/s to 4 m/s when recording on an innermost track of the optical recording medium and to have a linear velocity of 8 m/s to 9 m/s when recording on an outermost track of the optical recording medium, and the second recording mode is that the optical recording medium is rotated at a constant angular velocity so as to have a linear velocity of 5 m/s to 6 m/s when recording on an innermost track of the optical recording medium and to have a linear velocity of 13 m/s to 14 m/s when recording on an outermost track of the optical recording medium.

Further objects, features and advantages of the present invention will become apparent from the following description of the preferred embodiments with reference to the attached drawings.

BRIEF DESCRIPTION OF THE DRAWINGS

FIGS. 6A and 6B are schematic diagrams illustrating that a modulation factor decreases with an increasing transition linear velocity in recording with the same recording pulse wavelength, in which FIG. 6A shows a front pulse in a series of pulses applied for the formation of an amorphous mark, and an amorphous phase formed as a result of recording, FIG. 6B shows a second pulse, and a decreased amorphous area.

FIGS. 7A, 7B, and 7C are diagrams showing that an amorphous mark changes its size between a high transition linear velocity and a low transition linear velocity, in which FIG. 7A shows a multi-pulse, FIG. 7B shows an amorphous mark formed in recording using a recording layer with a high transition linear velocity, and FIG. 7C shows an amorphous mark formed in recording using a recording layer with a low transition linear velocity.

FIGS. 11A, 11B, and 11C show recording properties of an optical recording medium of Example A-1 in recording at 4× speed, in which FIG. 11A shows changes in σ/Tw (jitter), FIG. 11B shows changes in the modulation factor (mod.), and FIG. 11C shows changes in Itop.

FIGS. 12A, 12B, and 12C show recording properties of the optical recording medium of Example A-1 in recording at 2.4× speed, in which FIG. 12A shows changes in σ/Tw (jitter), FIG. 12B shows changes in the modulation factor (mod.), and FIG. 12C shows changes in Itop.

DESCRIPTION OF THE PREFERRED EMBODIMENTS

Figure 1:
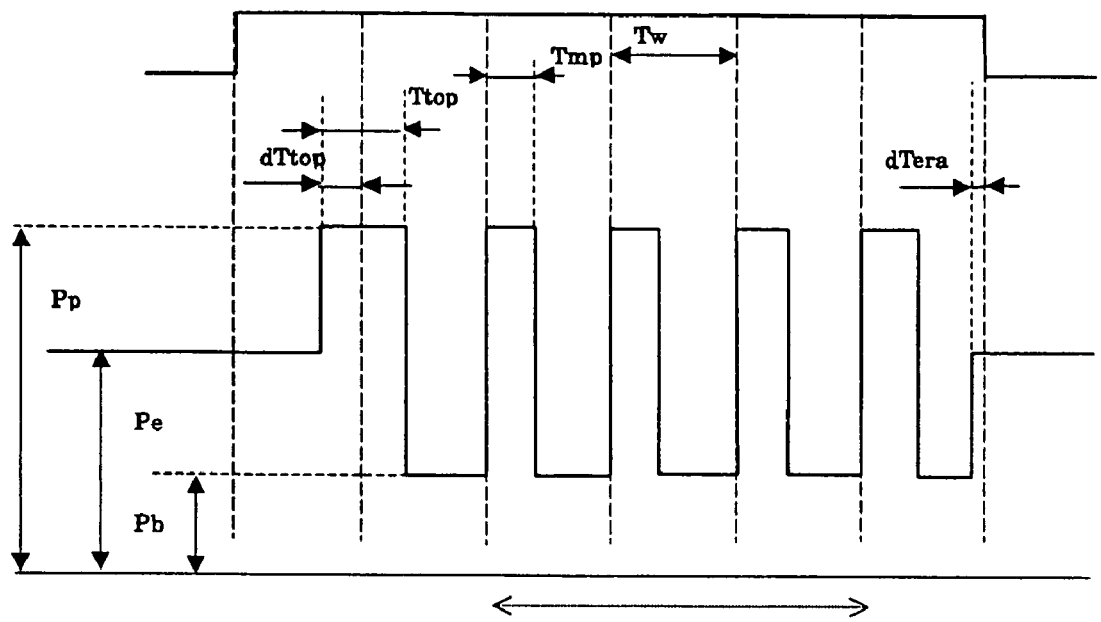
FIG. 1 is a diagram showing an example of a recording system used in DVD+RW media, in which marks and spaces are recorded multiple times.
Figure 2:
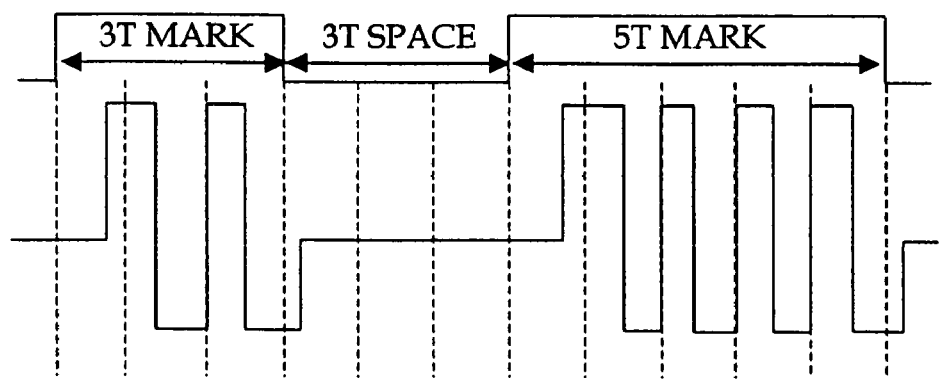
FIG. 2 is a diagram showing another example of a recording system used in DVD+RW media, in which marks and spaces are recorded multiple times.
Figure 3:
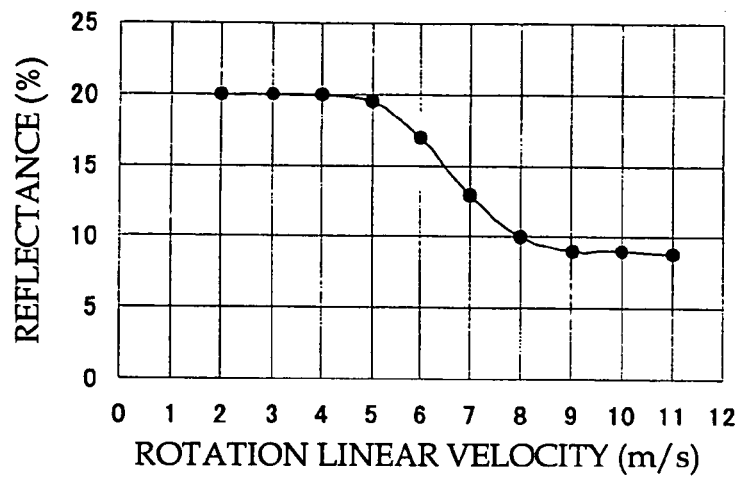
FIG. 3 is an explanatory diagram of a recrystallization critical velocity.

A guide groove is arranged on a substrate on which a recording layer will be formed. To ensure compatibility with DVD-ROM, the guide groove should have a track pitch of 0.74±0.03 µm. Likewise, the guide groove should be periodically wobbled and should be able to capture address information and media information by reversing the phase of the wobble as specified in the DVD+RW specifications.

When the wobbled groove (guide groove) has an amplitude of 15 nm to 40 nm, preferably 20 nm to 40 nm, a satisfactory carrier to noise ratio of wobble information readout from the wobbled groove may be obtained. If the amplitude is less than 15 nm, the carrier level excessively decreases to thereby increase readout error ratio of the address information and/or media information which has been written in the wobbled groove by phase change. If it exceeds 40 nm, the noise component increases due to interference with an adjacent wobbled groove to thereby increase readout error ratio of information. In addition, a modulation element may receive an increased burden in the formation of a stamper, i.e., in a light exposing process, and a groove may not be stably formed over the entire circle of the medium.

The depth of the wobbled groove (guide groove) is preferably from 22 nm to 40 nm, and more preferably from 24 nm to 30 nm. If the depth is less than 22 nm, a push-pull signal for identifying the guide groove by a recording apparatus may be excessively low, stable servo properties may not be obtained, and a tracking operation may not be conducted. If it exceeds 40 nm, the reflectance of the optical recording medium may decrease and the jitter properties and modulation factor may deteriorate.

The width of the wobbled groove is preferably from 0.17 µm to 0.30 µm, and more preferably from 0.20 µm to 0.28 µm. If the width is less than 0.17 µm, the reflectance may decrease. If it exceeds 0.30 µm, a track loss signal in data search may become excessively small, thus inviting insufficient searching.

On an optically transparent substrate bearing the wobbled groove having the aforementioned dimensions, there are a lower protective layer comprising a mixture of ZnS and $SiO_2$, a recording layer comprising Ag, In, Sb, Te, and Ge, an upper protective layer comprising a mixture of ZnS and $SiO_2$, a sulfuration-inhibiting layer mainly comprising SiC and/or Si, and a reflective layer comprising Ag or an Ag alloy, disposed in this order. An interfacial layer comprising an oxide is disposed either or both of between the recording layer and the lower protective layer and between the recording layer and the upper protective layer. In addition, by appropriately selecting the composition and thickness of each layer, the optical recording medium is so configured to have a transition linear velocity ranging from 8 m/s to 11 m/s as determined by irradiating continuous light with a power of 11±1 mW and a wavelength of 660±10 nm using a pickup head with a numerical aperture (NA) of 0.65 and to satisfy the following condition: $\Delta R=|Rb-Ra|\leq 3\%$, wherein Rb is a reflectance of an unrecorded area, and Ra is a reflectance of the top of an eye pattern after ten cycles of recording. Thus, the resulting optical recording medium can satisfactorily be recorded repeatedly at 4× speed (14 m/s) and can also satisfactorily be recorded at 1× to 2.4× speed with a recording power of 15 mW or less in a recording pulse wave pattern using a multi-pulse in a cycle of 1T. Such recording at 1× to 2.4× speed is employed in conventional drives for use in DVD media. The reflectance of the eye pattern top may also be referred to as the reflectance of a 14T space and may be briefly referred to as "Itop" in the description and the attached drawings.

The optically transparent substrate is preferably made of a polycarbonate for its high thermal resistance and impact resistance, and low water absorbency. The refractive index of the substrate is preferably from 1.5 to 1.65. If the refractive index exceeds 1.65, the optical medium as a whole may have a decreased reflectance. If it is less than 1.5, the optical medium may have an excessively increased reflectance, thus inviting an insufficient modulation factor.

The birefringence of the optically transparent substrate is preferably 50 nm or less. If it is more than 50 nm, the optical medium as a whole may have a decreased reflectance. When the birefringence distributes in a radius direction of the medium, the reflectance may also distribute in the same manner. Accordingly, the birefringence of the optically transparent substrate is preferably as low as possible.

The thickness of the optically transparent substrate is preferably from 0.59 mm to 0.62 mm. If the thickness is more than 0.62 mm, the pickup may have insufficient focusing properties. If it is less than 0.59 mm, the optical medium may not be sufficiently clamped by a recording and reproducing apparatus and the revolution of the optical recording medium may become unstable. If the optically transparent substrate has a portion having a thickness exceeding the above-specified range due to uneven thickness in a circumferential direction, a signal intensity may vary within the circumference.

To perform recording at high velocity multiple times, the amorphous mark must be crystallized at high velocity. The crystallization rate can be increased by adjusting the composition of the recording layer.

However, when the crystallization rate is high, the amorphous mark formed by action of the multi-pulse may easily be recrystallized, and an amorphous mark having a sufficient size may not be obtained, although the produced record can be erased at high velocity. This problem can be avoided, for example, in the following manner. A cycle (the total of the irradiation time of a recording power and the irradiation time of a bottom power) larger than 1T instead of the 1T cycle pulse strategy is employed, and the bottom power is thereby applied for a sufficiently long time to thereby reduce a recrystallized area as small as possible. Alternatively, a pulse of a high power is applied for a short time to thereby sufficiently increase the cooling time.

If a record is produced at low velocity on an optical recording medium having a recording layer with a high crystallization rate using powers and strategy similar to those in recording at low velocity on an optical recording medium having a recording layer with a low crystallization rate, recrystallization inhibits the formation of a sufficiently large mark, and the modulation factor decreases. To avoid this problem, the period of the multi-pulse, the recording power, and/or other parameters must be changed. However, drives for recording at 1× to 2.4× speed now commercially available are not compatible with these changes, thus the downward compatibility cannot be obtained.

To achieve the downward compatibility, the crystallization rate should have an upper limit. The present inventors have made evaluation on the downward compatibility at different crystallization rates obtained by adjusting the compositional ratio of the recording layer. However, the crystallization rate cannot be directly determined, and a "transition linear velocity" determined in the following manner was used instead of the crystallization rate.

Figure 4:
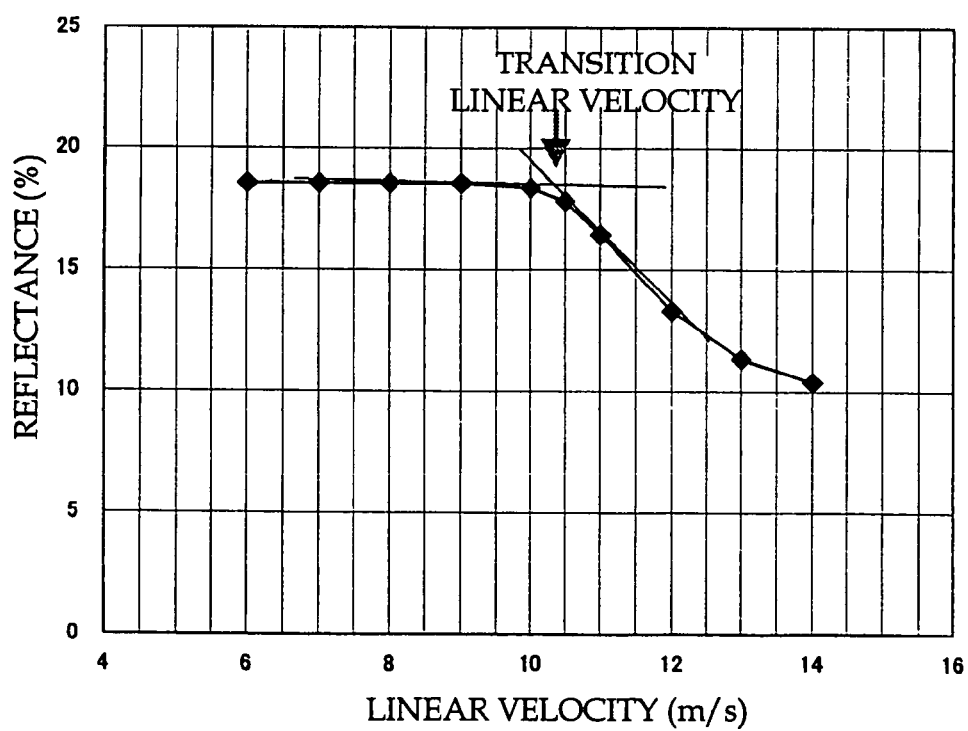
FIG. 4 is an explanatory schematic diagram of a transition linear velocity.

While rotating a sample optical recording medium at a constant linear velocity, continuous light is applied thereto in one circuit with tracking by the pickup, and the reflectance is measured at different rotational linear velocities with a constant power of the irradiated continuous light. In this case, the reflectance is high at low linear velocities but begins to decrease at a specific linear velocity. The linear velocity at which the reflectance begins to decrease is defined as the transition linear velocity. The determination of the transition linear velocity is shown in FIG. 4. More specifically, straight lines are drawn in a region in which the reflectance is substantially constant with an increasing linear velocity and in a region in which the reflectance decreases with an increasing linear velocity, respectively, and the point of intersection of these two lines is defined as the transition linear velocity. FIG. 4 shows that the recording layer is in a crystalline phase at a linear velocity lower than the transition linear velocity and becomes amorphous at a linear velocity higher than the transition linear velocity. The transition linear velocity depends on the crystallization rate of the recording layer, as well as the power of the applied continuous light and the thickness of the individual layers constituting the optical recording medium.

Figure 5:
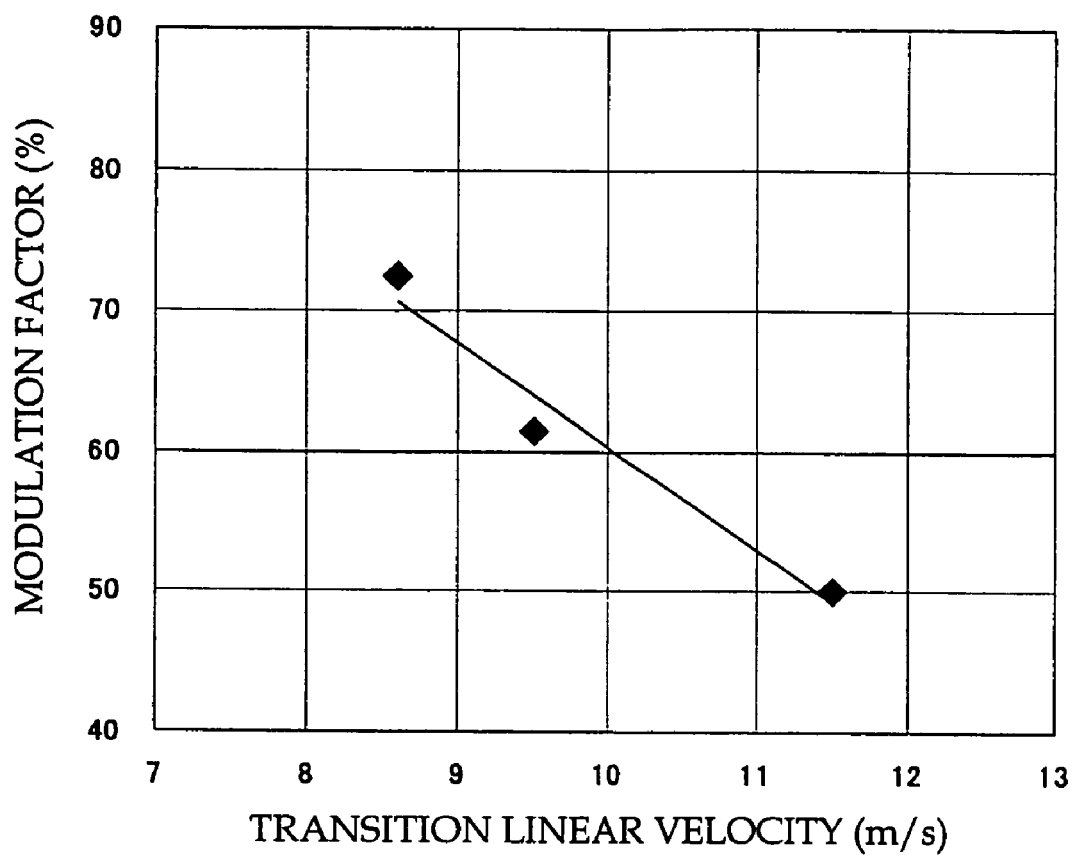
FIG. 5 is a graph showing the relationship between the transition linear velocity and the modulation factor in recording at 2.4× speed with a Pb of 12.8 mW.
Figure 7A:
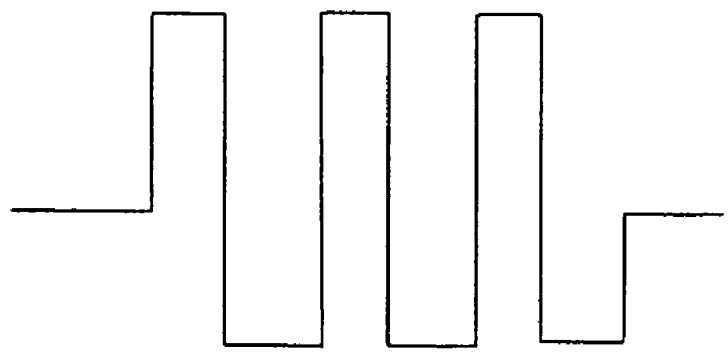
Figure 7B:
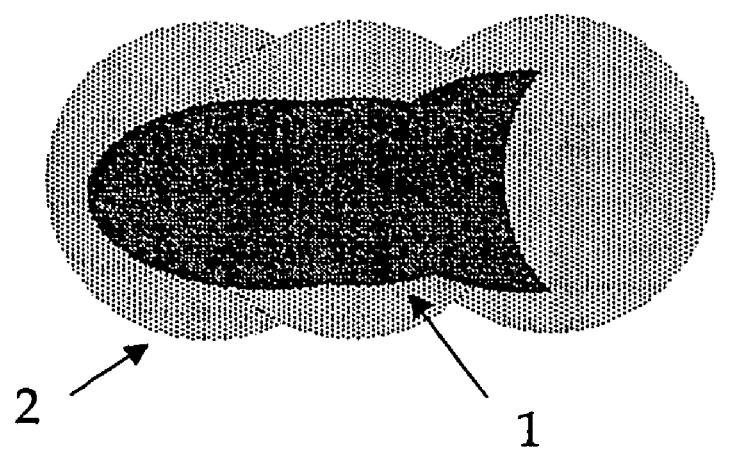
Figure 7C:
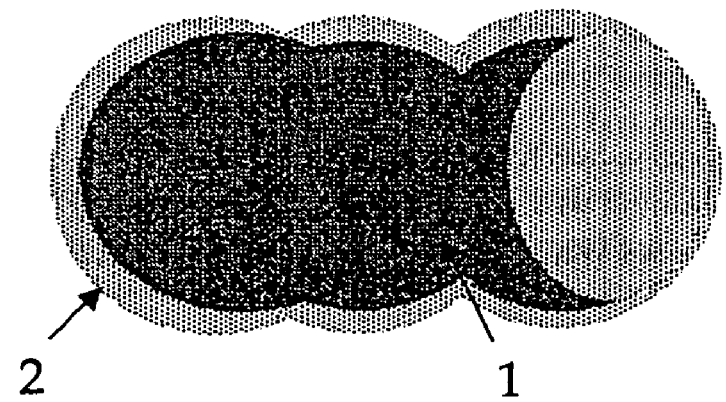

In general, the modulation factor decreases with an increasing transition linear velocity when an identical recording pulse pattern is used in recording, as shown in FIG. 5. The reason for this will be described with reference to FIGS. 6A and 6B. In the formation of an amorphous mark by the application of a series of pulses, a Pp of the front pulse is applied to thereby fuse the recording layer as shown in FIG. 6A. A Pb modulated from the Pp is then applied, the fused area in the recording layer is quenched and thereby becomes an amorphous phase 1. However, a part of the fused area in contact with a crystalline phase is recrystallized during quenching as shown with 2 in FIG. 6A. Next, a Pp of the second pulse is applied as shown in FIG. 6B to thereby fuse the recording layer 3. In this procedure, the amorphous area formed by action of the front pulse is also heated and is recrystallized from a region in contact with the crystalline phase as shown with 4. Thus, the amorphous area decreases in size as shown with 1' in FIG. 6B. The mark is formed through this process. With reference to FIGS. 7A, 7B, and 7C, the recrystallized area 2 is larger in recording using a recording layer having a higher transition linear velocity of FIG. 7B, namely, a higher crystallization rate, than in recording using a recording layer having a lower transition linear velocity of FIG. 7C, namely a lower crystallization rate. Accordingly, when the recording layer has a high transition linear velocity, the formed mark has a decreased area 1 even when an identical recording pulse pattern is applied to an identical fused area and/or the fused area is cooled at an identical cooling rate. Thus, the modulation factor decreases in recording using a recording layer having a high transition linear velocity.

The modulation factor may also decrease when the power of Pp is small or recording is performed at a higher recording linear velocity. This is because the recording layer is not sufficiently heated in both cases, the resulting fused area is small, and a large mark is not formed in both cases. According to DVD+RW specifications ver. 1.1, an optical recording medium must produce a satisfactory record (e.g., a jitter of 9% or less and a modulation factor of 60% or more) even at a power obtained by multiplying an optimized Pp by 0.85. To evaluate the downward compatibility, the relationship between the modulation factor and the transition linear velocity was determined in recording at 2.4× speed with a Pp of 12.8 mW (15 mW times 0.85 is 12.8 mW). The result is shown in FIG. 5. The transition linear velocity herein was determined by irradiating continuous light with a power of 11±1 mW at the surface of the optical recording medium using a pickup head with a wavelength of 660±10 nm and with a numerical aperture (NA) of an objective lens of 0.65. FIG. 5 shows that the modulation factor is 60% or more at a transition linear velocity of about 10 m/s or less. Thus, the transition linear velocity is preferably 10 m/s or less to ensure the downward compatibility. Even in consideration that the modulation factor also slightly depends on the layer configuration, the compositional ratio of the recording layer, and the recording pulse wave pattern in addition to the transition linear velocity, the upper limit of the transition linear velocity may be about 11 m/s.

However, when the upper limit of the transition linear velocity is set at about 10 m/s to 11 m/s for better downward compatibility, records cannot be satisfactorily produced at high velocity repeatedly, and the jitter increases with an increasing number of recording cycles.

To solve this problem, the present invention can successfully provide an optical recording medium that can satisfactorily be recorded at 4× speed by specifying the materials and thickness of each layer constituting the medium and the initialization conditions and by setting the transition linear velocity at 8 m/s or more, and preferably at 9 m/s or more as determined with the application of continuous light of 11 mW.

The lower and upper protective layers comprise a mixture of ZnS and $SiO_2$ for its high refractive index and high heat insulation properties, as well as for imparting thermal resistance and other functions as a protecting layer. In addition, by controlling the thickness of these layers, the optical recording medium can efficiently utilize incident light. The ratio of ZnS to $SiO_2$ in the mixture is preferably around 8/2.

The thickness of the lower protective layer is preferably from 40 nm to 220 nm, and more preferably from 40 nm to 80 nm for appropriate reflectance. The thickness may be set within this range so as to obtain an appropriate reflectance and a satisfactory recording sensitivity concurrently. If the thickness is less than 40 nm, the lower protective layer may not impart sufficient thermal resistance to the substrate, thus inviting increased damage to the substrate and an increased jitter after repeated cycles of recording. If it exceeds 220 nm, the optical recording medium may have an excessively high reflectance and may have a decreased recording sensitivity.

The thickness of the upper protective layer is preferably from 2 nm to 20 nm, and more preferably from 8 nm to 14 nm for appropriate thermal conduction. The reflective layer is further arranged on the upper protective layer, and heat absorbed by the recording layer diffuses via the upper protective layer to the reflective layer, and thereby the recording layer is cooled. If the thickness of the upper protective layer is excessively small, the heat excessively rapidly diffuses, and the recording layer may not be heated sufficiently, thus inviting a decreased recording sensitivity. If it is excessively large, the recording layer may not be cooled at a sufficient rate, thus disturbing the formation of an amorphous mark.

Preferably, a material for the recording layer comprises a composition corresponding to δ phase of Sb—Te as a parent phase and further comprises Ag, In, and Ge. The Sb—Te binary system forms a uniform phase, a δ phase, at a ratio of Sb to Te within a range from 83:17 to 63:37 in an equilibrium phase [G. Ghosh, J. Phase Equilibria, 15(3), 349-360(1994)]. Such a Sb—Te binary system having a composition substantially within the aforementioned range so as to form a δ phase can satisfactory recorded repeatedly. The crystallization rate of this system can be controlled by changing the ratio of Sb to Te. To improve archival durability, to control the crystallization rate and to improve the modulation factor, Ag, In, and Ge are added to the Sb—Te binary system having a composition within such a range as to form a δ phase as the parent phase.

The crystallization rate can be increased by adjusting the ratio of Sb to Te, and the types and amounts of the added elements. These compositional parameters determine the crystallization rate (substantially the transition linear velocity), the recording repeatability, and the archival stability.

After intensive investigations to provide a recording layer suitable for recording at 4× speed and having the downward compatibility, the present inventors have found that the following compositions are preferred. Specifically, in the parent phase Sb—Te, the atomic ratio [Sb/(Sb+Te)] of Sb to the total of Sb and Te is preferably from 0.74 to 0.79. If the atomic ratio is less than 0.74, the crystallization rate may decrease and records may not be satisfactorily produced multiple times at 4× speed. If it exceeds 0.79, satisfactory archival stability and good recording properties may not be obtained concurrently. For better archival stability, the total amount of Ag, In, and Ge is preferably 4 atomic percentage or more, and more preferably 6 atomic percentage or more. The upper limit of the total amount of these elements is preferably 10 atomic percentage, since if the total amount is excessively high, the recording layer may not be satisfactorily initialized and recording with a low jitter may become difficult. Per atom, Ge most contributes to improved archival stability. However, a combination use of Ag and In with Ge varies the optical properties of the recording layer and improves the archival stability and the recording sensitivity more than the single use of Ge. The addition of Ag and Ge decreases the crystallization rate, and the addition of In increases the crystallization rate. The compositional ratio of the added elements must be set also in consideration of the crystallization rate. For better archival stability, easier initialization, higher recording properties, and appropriate crystallization rate, the elements added to the recording layer preferably satisfy the following conditions in atomic percentage: $0.1 \leq Ag \leq 1$, $2 \leq In \leq 6$, and $2 \leq Ge \leq 6$. Thus, the resulting optical recording medium is suitable for recording at 4× speed and has the downward compatibility. If the amount of each element is excessively small, advantages of the addition may not be obtained. If it is excessively large, the recording repeatability may deteriorate.

The thickness of the recording layer is preferably 8 nm to 22 nm, and further preferably from 13 nm to 16 nm for better durability in repeated cycles of recording. If the thickness is less than 8 nm, the modulation factor and the optical stability in reproduction may decrease. If it exceeds 22 nm, the jitter may increase in repeated cycles of recording.

Conventional reflective layers comprise an alloy mainly containing Al. Al has a high reflectance and high thermal conductivity and exhibits excellent stability with time when formed into an optical recording medium. However, when an Al alloy is used in the reflective layer in combination with a recording layer having a high crystallization rate, a recorded mark may often become thin, and the optical recording medium may not be satisfactorily carried out recording with a sufficient modulation factor. This is because a recrystallized area in a fused area increases during recording, and the resulting amorphous area may decrease when the recording layer has a high crystallization rate. To reduce the recrystallized area, the upper protective layer may be thinned to thereby provide a quenching structure. However, when the upper protective layer is simply thinned, the recording layer is not heated sufficiently, and the resulting fused area may have a decreased size. Accordingly, the formed amorphous area decreases, even though the recrystallized area can be decreased. However, by using a metal having parameters n and k in the reflectance n+ik at a wavelength of 650 nm to 670 nm lower than those of Al, the recording layer can have an increased optical absorptivity and an increased modulation factor. Such metals having n and k larger than those of Al are Au, Ag, Cu, and alloys mainly comprising at least one of these elements. The term "mainly comprising" as used herein means an element in question is contained in an amount of 90 atomic percentage or more, and preferably 95 atomic percentage or more.

Table 1 shows actual measurements of the refractive index at λ of 660 nm and the literature values (bulk) of the thermal conductivity of sputtered films each comprising one of these metals alone.

TABLE 1

|    | n    | k   | Thermal conductivity (W/m/K) |
|----|------|-----|------------------------------|
| Au | 0.15 | 3.5 | 315                          |
| Ag | 0.1  | 4.1 | 427                          |
| Cu | 0.25 | 2.9 | 398                          |
| Al | 1.3  | 6.5 | 237                          |

Table 1 shows that Au, Ag, and Cu each have lower parameters n and k and a higher thermal conductivity than Al. By using these elements in the recording layer, the optical absorptivity of the recording layer increases to elevate the temperature of the recording layer to thereby increase the fused area in size. In addition, the cooling rate of the recording layer increases to thereby decrease the recrystallized area in size during cooling. Thus, a larger amorphous area than the use of an Al alloy can be formed. The modulation factor of the recording mark depends on an optical modulation factor and the size of the mark and increases with an increasing optical modulation factor and an increasing size of the mark. By using the aforementioned reflective layer in recording at high linear velocity using a material having a high crystallization rate as the recording layer, a larger recording mark can be formed due to a higher optical absorptivity and higher cooling rate. In addition, records can be produced with a high modulation factor due to a large difference in reflectance between the crystalline phase and the amorphous phase.

Among Au, Ag, Cu, and alloys mainly comprising at least one of these elements, Ag and Ag alloys are available at relatively low cost and are more resistant to oxidation than Cu and Cu alloys which are also available at relatively low cost. Accordingly, Ag and Ag alloys are preferably used in the reflective layer for better stability with time of the medium. However, these materials are susceptive to sulfuration, and a sulfuration-inhibiting layer must be arranged when the upper protective layer contains S. Such a sulfuration-inhibiting layer must not contain S and must not allow S to pass therethrough.

The present inventors made investigations on the recording properties and archival reliability of optical recording medium using various oxide films and nitride films as a sulfuration-inhibiting layer and have found that a material mainly comprising SiC and/or Si has excellent functions as the sulfuration-inhibiting layer. The term "mainly comprising" as used herein means that the material comprises at least one of SiC and Si in an amount of 90 mol % or more, and preferably 95 mol % or more.

The thickness of the sulfuration-inhibiting layer is 2 nm to 22 nm, and preferably from 3 nm to 22 nm. A film formed by sputtering having a thickness of 3 nm or more is substantially uniform and can exhibit its sulfuration inhibiting functions. If the thickness is less than 2 nm, the probability of partial defects rapidly increases. If it exceeds 22 nm, the reflectance may decrease. In addition, the thickness of the sulfuration-inhibiting layer is preferably equal to or less than the thickness of the recording layer, and its preferred upper limit is 22 nm. This is because the film forming rate of the sulfuration-inhibiting layer is at most nearly equivalent to that of the recording layer, and if the thickness of the sulfuration-inhibiting layer is larger than that of the recording layer, the production efficiency may decrease.

The thickness of the reflective layer is preferably from 90 nm to 200 nm. If the thickness is 90 nm or more, the reflective layer does not significantly allow light to pass therethrough and the applied light can be utilized efficiently. With an increasing thickness of the reflective layer, the cooling rate increases and this is advantageous in recording using a recording layer having a high crystallization rate. However, if the thickness exceeds 200 nm, the cooling rate becomes saturated, the recording properties are not further improved, and it takes a longer time to form the reflective layer. Thus, the preferred upper limit of the thickness is 200 nm.

As described above, the present invention specifies the upper limit of the transition linear velocity corresponding to the crystallization rate for achieving the downward compatibility, and such a limited transition linear velocity does not contribute to satisfactory recording at high linear velocity. However, according to the present invention, the durability in repeated cycles of recording at high linear velocity can be improved without changing the transition linear velocity by providing an oxide interfacial layer at least one of between the recording layer and the lower protective layer and between the recording layer and the upper protective layer.

Preferred oxides for use in the interfacial layer are oxides mainly comprising at least one of $ZrO_2$, $TiO_2$, $SiO_2$, $Al_2O_3$, and $Ta_2O_5$ and mixtures of these oxides. The term "mainly comprising" used herein means that the interfacial layer comprises the substance in question in an amount of 40 mol % or more. Some oxides may highly accelerate the crystallization to thereby increase the transition linear velocity. However, the above-specified oxides do not significantly affect the transition linear velocity.

When a medium having a relatively low transition linear velocity undergoes repeated cycles of recording at high velocity to thereby increase the jitter, the reflectance between marks or of a short mark decreases. This is probably because the produced record is not sufficiently erased, namely, the recording layer is not satisfactorily recrystallized during repeated cycles of recording, and partial areas which do not become into an initial crystalline phase and have a low reflectance accumulate.

However, by employing the configuration according to the present invention, the reflectance between marks or of a short mark does not decrease even after repeated cycles of recording, thus avoiding an increased jitter. This is probably because the oxide layer serves to accelerate the formation of crystal nuclei and to accelerate crystallization at relatively low temperatures.

Figure 8:
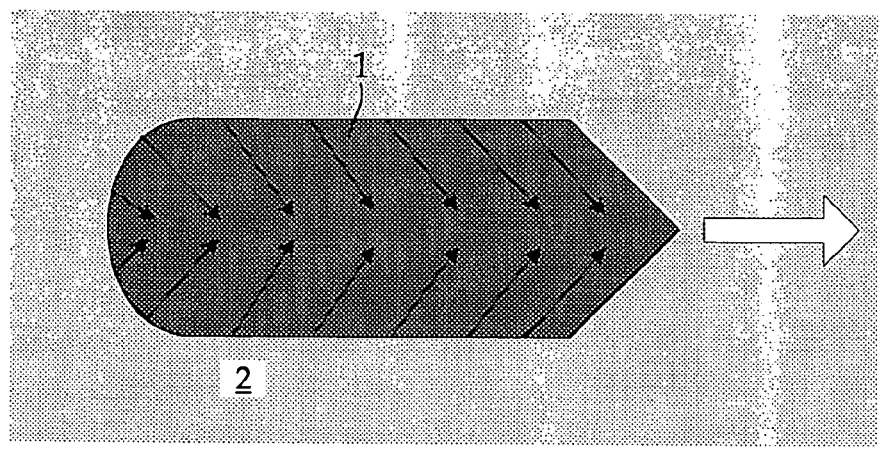
FIG. 8 is a schematic diagram showing that an amorphous mark is irradiated with laser light and a crystal grows and extends from the interface between the amorphous area and a crystalline area.

The crystallization proceeds through two processes, i.e. formation of crystal nuclei and crystal growth. However, when a material comprising the Sb—Te binary system in the vicinity of a δ phase as a parent phase is used, nuclei do not form uniformly in recording and erasing procedures, and the crystallization in the amorphous area proceeds by action of the crystal growth from the interface with the crystalline area. FIG. 8 schematically illustrates that laser light is applied to an amorphous mark 1 in a direction shown with the arrow, a crystal grows at the interface between the amorphous area 1 and a crystalline area 2, and the amorphous mark becomes crystallized in the directions shown with the arrows.

Figure 9:
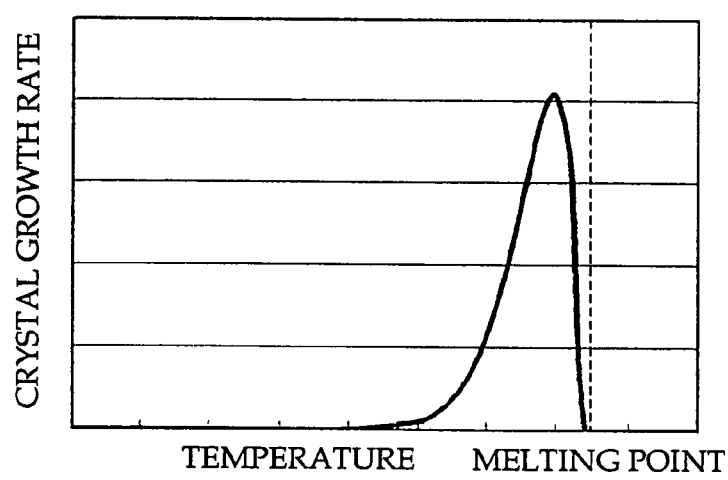
FIG. 9 is a diagram showing the relationship between a temperature and a crystal growth rate.

FIG. 9 shows the relationship between the temperature and the crystal growth rate. FIG. 9 shows that a crystal grows at high velocity within specific temperatures immediately below the melting point. If the edge of the mark is not sufficiently heated to a temperature to allow the crystal to grow at high velocity, insufficient erasing occurs due to slow crystal growth. When laser beam is applied and an area whose temperature reaches to a temperature to allow the crystal to grow at high velocity is sufficiently large with respect to the width of the peak, the crystallization rapidly proceeds from the edge of the mark. If the area has a similar size to the width of the mark, a part of the edge of the mark may not reach a temperature to allow the crystal to grow at high velocity, insufficient erasing may occur when a mark has an uneven width and partially has a large width or when the tracking of a recording beam deviates a little from a center part.

By using the oxide interfacial layer, the durability in repeated cycles of recording increases. This is probably because the use of the oxide layer accelerates the formation of crystal nuclei, and crystal nuclei are formed inside a mark even if the temperature of the edge is relatively low and the crystal growth rate is not sufficiently high. Thus, the crystallization satisfactorily proceeds due to the crystal growth from the crystal nuclei, thus avoiding insufficient erasing.

When the interfacial layer is provided, the thickness of the lower protective layer and/or the upper protective layer should preferably be reduced by that of the interfacial layer for controlling the optical properties and thermal properties.

The transition linear velocity reflects the process of recrystallization of a fused area, thus reflects the crystal growth from the interface between the fused area and the crystalline area and is not significantly affected by the nuclei formation. Accordingly, even when the transition linear velocity does not become high, the aforementioned advantages can be obtained.

The thickness of the oxide interfacial layer is preferably 1 nm or more for sufficient advantages. It is preferably 20 nm or less, and more preferably 10 nm or less, since such an oxide layer is not formed at film forming rate.

After sequentially forming the aforementioned layers on the substrate, an organic protective film is formed on the reflective layer by spin coating. The resulting article as intact or after a cladding process is subjected to an initialization process to thereby yield an optical recording medium.

In the cladding process, a plate having the same size and generally comprising the same material as the substrate is bonded with the substrate through the organic protective film.

In the initialization process, laser light of about 1 W to 2 W having a size of about 1 μm in width and several ten micrometers to several hundred micrometers in length is applied to the recording layer to thereby crystallize the recording layer. The recording layer immediately after formation is amorphous. The crystalline state and reflectance of the recording layer vary depending on the power and linear velocity of the applied laser light, and the feed speed of the substrate. Even when the reflectance of a space area, i.e., the reflectance of the crystalline area immediately after initialization differs, it converges to a specific value after repeated cycles of recording.

Figure 10:
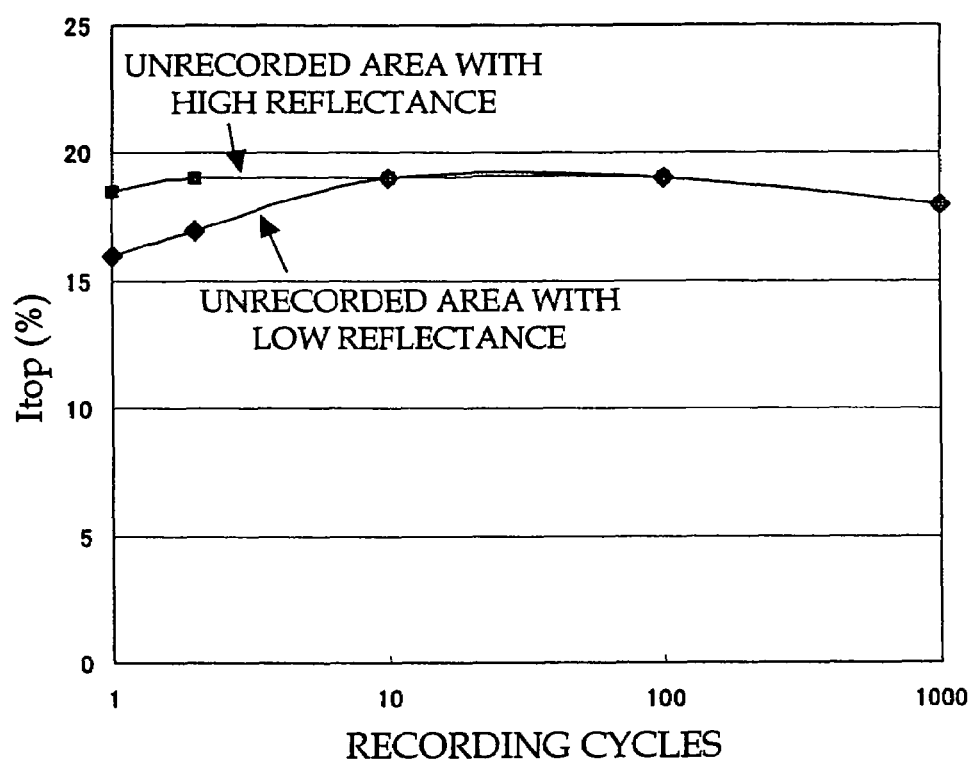
FIG. 10 is a graph showing changes in Itop in repeated cycles of recording at 4× speed on optical recording media which have been initialized under different conditions and have different reflectance in an unrecorded area.

FIG. 10 is a graph showing changes in the reflectance of an eye pattern top (Itop) in repeated cycles of recording at 4× speed on optical recording media which have been initialized under different conditions and have different reflectance in an unrecorded area. The reflectance becomes saturated after about ten cycles of recording. This is because an initial crystalline phase remains in the space area after a few cycles of recording, but a crystalline phase newly formed after the formation of an amorphous mark increases. The reflectance may decrease after several hundred cycles to about thousand cycles of recording due to some deterioration caused by repeated cycles of recording.

The recording repeatability also varies depending on the initialization conditions and may become better by allowing the initial crystalline phase to have a relatively low reflectance. However, the present inventors have found that a crystalline phase having a low reflectance invites deteriorated recording properties in recording at 4× speed and an increased jitter when it is left to stand at room temperature for 1 to 2 weeks after initialization. Such a change with time is not observed in recording at 1× speed or at 2.4× speed. This is probably because records can be produced with a sufficient power in recording at 1× speed or at 2.4× speed, since deterioration with time is little when records are produced at 4× speed at a relatively high power.

The reason for the deterioration in recording properties in recording at a relatively low power has not been clarified, but this is probably because an unrecorded area having a low reflectance is low in stability of the crystalline phase, thus inviting deteriorated recording properties. The recording properties may deteriorate when the reflectance of the unrecorded area is sufficiently high but the composition of the recording layer is not appropriate. However, the deterioration is not prevented unless at least the reflectance of the unrecorded area is sufficiently high.

Preferred embodiments of the phase-change material for the recording layer will be described below.

By using the phase-change material according to any one of the configurations <1> to <5>, the resulting optical recording medium has excellent overwriting properties and archival reliability and enables recording over a wide range of linear velocities. As described in the above-mentioned patent publication, Ag—In—Sb—Te is an excellent phase-change material but has insufficient archival reliability at high temperatures. As a possible solution to this problem, Ge may be added thereto. However, Ge slows down the recrystallization critical velocity and should be added within a limited range. Accordingly, the atomic ratio of Ge is preferably from 0.010 to 0.080 as specified in the aspect <1> and more preferably from 0.030 to 0.050.

Such elements that slow down the recrystallization critical velocity also include Ag and Te.

Te is a constitutional element of the parent material SbTe and the atomic ratio of Te cannot be set simply depending on the regulation of the recrystallization critical velocity. Accordingly, the atomic ratio of Te is preferably from 0.100 to 0.300 as specified in the aspect <1> and more preferably from 0.200 to 0.250.

Ag is capable of improving the recording sensitivity and of stabilizing the discharge in DC sputtering, is desirably added in an appropriate amount but is not necessarily added. Accordingly, the atomic ratio of Ag is preferably from 0 to 0.015 as specified in the aspect <1>, more preferably from 0.001 to 0.015, and further preferably from 0.002 to 0.005.

Indium (In) and Sb increase the recrystallization critical velocity. Indium (In) in an excess amount may invite optical deterioration in reproduction or initial jitter deterioration, and the atomic ratio of In is preferably from 0.010 to 0.080 as specified in the aspect <1>, and more preferably from 0.020 to 0.040. Sb is a constitutional element of the parent material SbTe and the atomic ratio of Sb cannot be set simply depending on the regulation of the recrystallization critical velocity. Accordingly, the atomic ratio of Sb is preferably from 0.600 to 0.800 as specified in the aspect <1>, and more preferably from 0.650 to 0.750.

The phase-change material for use in the aspect <1> mainly comprises Sb—Te as a parent material and further comprises Ag, In, and Ge as additional elements. The total amount of the additional elements Ag, In, and Ge (hereinafter referred to as a "total additional amount") is preferably more than 0.050 and less than 0.090 as specified in the aspect <1>, more preferably from 0.060 to 0.080, and further preferably from 0.065 to 0.075. If the total additional amount is 0.090 or more, initial jitter and other initial optical recording medium properties may deteriorate. If it is 0.050 or less, the archival reliability may deteriorate. This is probably because the additional elements in excess amounts significantly affect the parent material Sb—Te and adversely affect the phase change. In contrast, the additional elements in insufficient amounts may allow the parent material Sb—Te to exhibit its own properties markedly, thus inviting insufficient archival reliability which is inherent to Sb—Te.

The ratio $[a/(a+b+c)]$ of Ag to the total additional amount is preferably 0.10 or less as specified in the aspect <1>, and more preferably 0.08 or less for better recording properties at high linear velocity. Although its detail has not been clarified, this is probably because Ag in an excess ratio invites an excessively increased thermal conductivity of the phase-change material itself and thus affects the crystallization in high-velocity recording.

The ratio $[x/(x+y)]$ of Sb to the total of Sb and Te is preferably from 0.75 to 0.85 as specified in the aspect <4>, and more preferably from 0.76 to 0.78. Sb in an excess ratio may invite decreased archival reliability, and Sb in an insufficient ratio may not contribute to improvement in the recrystallization critical velocity.

In a conventional technique, the recording linear velocity is believed to be preferably lower than the recrystallization critical velocity, and the quenching effect is used for converting a crystalline phase to an amorphous phase by controlling the strategy of laser or the layer configuration of a medium. However, to achieve high-velocity recording at a linear velocity of 8.44 m/s or higher in an Ag—In—Sb—Te—Ge system, i.e., a Sb—Te parent system according to this technique, Sb must be increased to increase the recrystallization critical velocity, thus failing to ensure the archival reliability. In such a high-velocity recording, the pulse width of the strategy of laser is narrowed to thereby fail to ensure a sufficient cooling time. Thus, the crystalline phase may not be effectively converted into an amorphous phase. A high recording density results in similar defects, and at worst, the pulse width may become less than the rising edge of laser. Under these circumstances, no cooling time is provided, and the laser power cannot be sufficiently reduced to the minimum power Pb. As a possible solution to this problem, the number of pulses may be reduced to thereby widen the pulse width. However, control of the mark length becomes difficult in this technique, thus inviting unstable recording properties. In addition, the recording sensitivity at low linear velocity significantly deteriorates, and the downward compatibility cannot be obtained.

After investigations to solve these problems, the present inventors have found that when an optical recording medium for use in recording at a linear velocity of 3.5 m/s to 14 m/s is configured so as to satisfy the following condition:

$$3.5 < [Rmaxv - RCv] < 5$$

wherein RCv is the recrystallization critical velocity (m/s) of the recording layer; and Rmaxv is the maximum recording velocity (m/s) of the recording layer, as specified in the aspect <5>, the resulting optical recording medium can be recorded at higher velocity than conventional equivalents, has satisfactory archival reliability and ensures the downward compatibility. Namely, they have found that, by using a phase-change material having a composition such that the recrystallization critical velocity RCv is lower than the maximum recording linear velocity of the medium within a specific range, the resulting optical recording medium can have satisfactory archival reliability and can suppress the deterioration in recording sensitivity at low linear velocity.

However, an excessively low recrystallization critical velocity may adversely affect the high-velocity recording. Accordingly, the value [Rmaxv–RCv] is preferably more than 3.5 m/s and less than 5 m/s as specified in the aspect <5>, and more preferably from 4.0 m/s to 4.5 m/s.

In such a high-velocity recording, the laser power must also be controlled. Specifically, if the erasing power Pe is excessively high, the applied Pe cannot satisfactorily erase the stored data, namely, cannot satisfactorily convert an amorphous phase to a crystalline phase, a recorded area thereby remains amorphous, and normal recording cannot be performed. This problem becomes significant in overwriting. Accordingly, the ratio (Pp/Pe) of the peak power Pp to the erasing power Pe is preferably more than 0.25 and less than 0.35, and more preferably from 0.3 to 0.35.

The optical recording medium of the present invention comprises the lower protective layer, the recording layer, the upper protective layer, and the reflective layer and may further comprise additional layers appropriately selected according to the purpose.

Materials for the lower and upper protective layers include, for example, oxides, nitrides, and sulfides as in conventional equivalents, of which a mixture of ZnS and $SiO_2$ is preferred.

The thickness of the lower protective layer affect the reflectance of the optical recording medium and is from 40 nm to 220 nm as described above, and preferably from 40 nm to 80 nm. If the thickness is less than 40 nm, the reflectance largely varies with respect to the thickness. If it exceeds 80 nm, it may take a long time to form the lower protective layer, thus inviting decreased productivity of the optical recording medium. In addition, such a large thickness may invite deformation of the substrate when the substrate is thin as in DVD media. Typically preferably, the thickness is such as to yield a minimum reflectance. The thickness of the lower protective layer significantly affects the reflectance, and the reflectance varies in a sine wave manner with a varying thickness. By selecting such a thickness as to yield a minimum reflectance, applied light enters into the recording layer most efficiently, thus improving the recording sensitivity and ensuring satisfactory mark formation. However, an excessively low reflectance disturbs readout of data signals, and the absolute value of the reflectance to be minimum has a lower limit.

The thickness of the upper protective layer is from 2 nm to 20 nm as described above, and preferably from 5 nm to 20 nm, and more preferably from 10 nm to 15 nm. If the thickness is less than 5 nm, the recording layer may not accumulate sufficient quantity of heat to induce phase change. If it exceeds 20 nm, heat in the recording layer may not dissipate effectively, thus the crystalline phase may not become amorphous sufficiently.

The thickness of the recording layer is from 5 nm to 22 nm as described above, and preferably from 5 nm to 20 nm, and more preferably from 10 nm to 15 nm for satisfactory recording properties.

Preferred materials for the reflective layer are Al, Ag, Au, Cu, and other metals, and alloys thereof for their satisfactory optical properties and thermal conductivity. Among them, Ag or an Ag alloy having the highest thermal conductivity is preferably used in the present invention, since a quenching structure is desirable. When the reflective layer comprises Ag and the upper protective layer comprises ZnS and $SiO_2$, a sulfuration-inhibiting layer must be arranged between the upper protective layer and the reflective layer to thereby avoid sulfuration of Ag by sulfur in the upper protective layer. A material for the sulfuration-inhibiting layer must be resistant to sulfuration, and examples of such materials are Si, Al, and other metals, SiN, AlN, and other nitrides, and SiC, TiC, and other carbides. The thickness of the sulfuration-inhibiting layer is from 2 nm to 22 nm, preferably from 3 nm to 22 nm as described above, and more preferably from about 2 nm to 5 nm, and furthermore preferably from 3 nm to 5 nm. If the thickness is less than 2 nm, sulfuration may not be inhibited effectively. If it exceeds 5 nm, heat dissipation and optical properties may be adversely affected.

The thickness of the reflective layer is from 90 nm to 200 nm as described above, and preferably from 100 nm to 200 nm, and more preferably from 120 nm to 150 nm. If the thickness is less than 100 nm, heat may not dissipate effectively. If it exceeds 90 nm, moreover 200 nm, the heat dissipation may become saturated, and it may take a long time to form the reflective layer.

The present inventors have also found that, by arranging a dielectric layer (interface layer) comprising an oxide in contact with the recording layer, the recording properties at high linear velocity, particularly DOW properties at high power can be improved. They have verified that this effect can be obtained when the dielectric layer (interface layer) is arranged directly below the recording layer, i.e., between the recording layer and the lower protective layer, is arranged directly above the recording layer, i.e., between the recording layer and the upper protective layer, or is arranged both directly below and directly above the recording layer.

Although its detail has not been clarified, this is probably because the oxide material accelerate the crystallization of the phase-change material. The use of such an oxide material capable of accelerating the crystallization is suspected to be more effective for improving the properties of the medium in high-velocity recording, since recording is performed in this case at a linear velocity higher than the recrystallization critical velocity.

Preferred examples of the oxide material are oxides of Group IIa elements except Be and Ra; Groups IIIb, IVa, IVb, Va, Vb, VIIa, VIIb, VIIa, and VIIb elements except Tc and Re, Group Ib elements except Fe, Co, Ni, and Au; Group IIb elements except Hg; Group IIIa elements except B and Ti; Group VIa elements except C; and Sb and Bi. Among them, typically preferred are oxides of Zr, Ti, Al, Zn, In, Sn, Cr, W, Mo, Ni, Ta, as well as Y and other rare earth elements.

Among them, an oxide material mainly comprising zirconium dioxide ($ZrO_2$) and titanium dioxide ($TiO_2$) as specified in the aspect <7> is typically preferably used for better properties. The term "mainly comprising" as used herein means that the zirconium dioxide and the titanium dioxide is contained in the oxide material in an amount of 80 mol % or more. The properties can further be improved by using any one of oxides of rare earth elements and oxides of Group IIa elements except Be and Ra in addition to the zirconium dioxide and titanium dioxide as specified in the aspect <8>. The addition of these oxides of rare earth elements and oxides of Group IIa elements except Be and Ra may reduce a volume change of zirconium dioxide with a varying temperature. The resulting optical recording medium can be stable against a varying temperature during initialization or recording. In addition, the optical recording medium becomes resistant to cracking in the formation of a target and can be relatively easily highly packed. To obtain these advantages more effectively, the total amount of these additional oxides is preferably from 1 to 10 mol % relative to $ZrO_2$ as specified in the aspect <9>.

The titanium dioxide may serve to control the optical properties and to control the acceleration in crystallization. To obtain these advantages more effectively, the amount of the titanium dioxide is preferably from 10 mol % to 50 mol % of the total oxide material as specified in the aspect <10>.

The thickness of the dielectric layer (interface layer) is from 1 nm to 20 nm as described above, and preferably from 2 nm to 5 nm, and more preferably from 2 nm to 4 nm. If the thickness is less than 2 nm, the crystallization may not be effectively accelerated or a film having a constant thickness may not be obtained. If it exceeds 5 nm, the crystallization may be excessively accelerated to thereby deteriorate archival properties at high temperatures. In addition, it may take an excessively long time to form the dielectric layer (interface layer). The term "thickness of the dielectric layer (interface layer)" as used herein means the total thickness of the entire oxide dielectric layer(s). For example, when the dielectric layer (interface layer) is arranged on both sides of the recording layer, the thickness means the total thickness of the two dielectric layer(interface layer)s.

The substrate for use herein preferably has a wobbled groove having a track pitch of 0.74±0.03 μm, a groove depth of 22 nm to 40 nm, and a groove width of 0.20 μm to 0.40 μm on its surface as specified in the aspect <13>. The resulting optical recording medium can be used as a DVD+RW medium that satisfies the present specifications of DVD+RW media, can ensure the downward compatibility and can be recorded in a CAV manner at high velocity of 14 m/s. If the track pitch is out of the above-specified range, the DVD+RW medium may have insufficient compatibility with DVD-ROM or DVD-Movie media. High compatibility with DVD-ROM or DVD-Movie system is one of features of the DVD+RW media. For better recording properties in addition to better compatibility, the groove depth and groove width are preferably within the above-specified ranges.

For the downward compatibility, a sufficient recording sensitivity in recording at 8.4 m/s can be obtained by employing one of the aspects <1> to <12>.

The groove is wobbled in order to allow a pickup to access a specific unrecorded track and to allow the substrate to rotate at a constant linear velocity. The period of wobble is preferably 20 times to 35 times the reference clock frequency T (sec) of data. If the period is less than 20 times the reference clock frequency T, a recording signal component may be detected as noise. If it exceeds 35 times the reference clock frequency T, the minimum access area increases, thus inhibiting fine control of access. The amplitude of the wobble is preferably from 15 nm to 40 nm, and more preferably from 20 nm to 40 nm. If the amplitude is less than 20 nm, a sufficient signal intensity may not be obtained. If it exceeds 40 nm, the recording properties may deteriorate.

The initialization power and the feed speed of the laser can be optionally appropriately set.

Thus, the resulting optical recording medium has a wide margin in recording linear velocities, can be recorded at high velocity and has excellent archival reliability as specified in the aspect <15>. The optical recording medium can be recorded according to the two CAV systems as specified in the aspect <16> and can be a novel DVD+RW medium that can perform CAV recording at higher velocity also at velocity conventionally employed in CAV recording of conventional DVD+RW media.

The present invention will be illustrated in further detail with reference to several examples below. However, the present invention is not specifically limited to the compositions, constitutional elements of the recording layer, materials for the protective layer, materials for the reflective layer, the layer configurations, preparation methods, preparation apparatus, evaluation apparatus, and other conditions and parameters described in the examples.

In Examples A-1, A-2, A-3, and A-4, and Comparative Example A-1, a sample was prepared in the following manner. Specifically, a polycarbonate disc substrate having a diameter of 12 cm and a thickness of 0.6 mm was used. The substrate had a guide groove having a track pitch of 0.74 μm, a groove width of 0.25 μm, a groove depth of 25 nm and wobble with a cycle of about 820 kHz. On the substrate were formed a lower protective layer, (a lower interfacial layer), a recording layer, (an upper interfacial layer), an upper protective layer, a sulfuration-inhibiting layer, and a reflective layer in this order by sputtering. An organic protective film was formed on the reflective layer by spin coating, and another polycarbonate disc having a diameter of 12 cm and a thickness of 0.6 mm was bonded by adhesion on the organic protective film and thereby yielded an optical recording medium. The optical recording medium was initialized by irradiating with semiconductor laser beams having a beam diameter of 1- by 75-μm and a wavelength of 810 nm and thereby yielded the sample. For evaluation, a random pattern was recorded multiple times in an EFM plus modulation system using a recording pulse pattern comprising a multipulse of a linear density of 0.267 μm/bit and a period of 1T and applying laser light having a wavelength of 656 nm and a NA of 0.65 to the substrate side.

EXAMPLE A-1

A disc having a lower protective layer, a recording layer, an upper interfacial layer, an upper protective layer, a sulfuration-inhibiting layer, and a reflective layer arranged on the substrate in this order was used. The lower protective layer comprised 80 mol % of ZnS and 20 mol % of $SiO_2$ and had a thickness of 65 nm. The recording layer had a composition of $Ag_{0.7}In_{2.6}Sb_{71.5}Te_{20.9}Ge_{4.3}$ and had a thickness of 15 nm. The upper interfacial layer was arranged between the recording layer and the upper protective layer, comprised 80 mol % of ($ZrO_2$-3 mol % $Y_2O_3$) and 20 mol % of $TiO_2$ and had a thickness of 2 nm. The upper protective layer comprised 80 mol % of ZnS and 20 mol % of $SiO_2$ and had a thickness of 10 nm. The sulfuration-inhibiting layer comprised Si and had a thickness of 4 nm. The reflective layer comprised Ag and had a thickness of 140 nm.

The disc was initialized at a power of 1200 mW, a linear velocity of 9 m/s and a feed speed of 20 μm/r.

In this procedure, the reflectance of an unrecorded area was 19.9%. The transition linear velocity was 9.5 m/s as determined by applying continuous light of 11 mW.

Figure 11A:
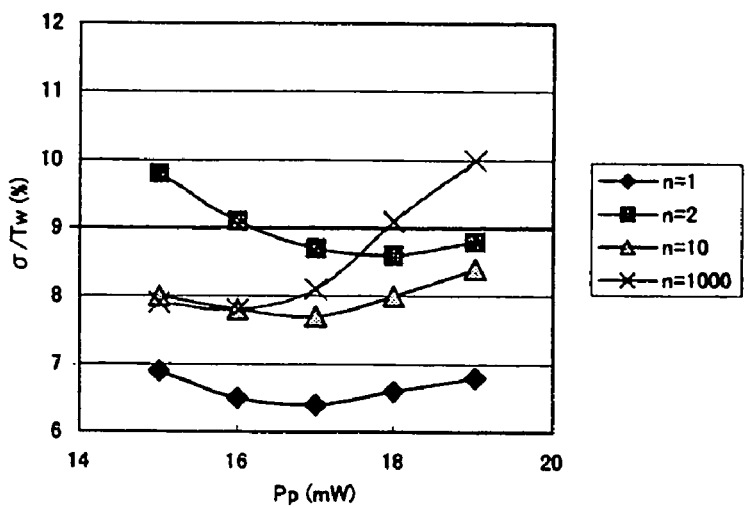
Figure 11B:
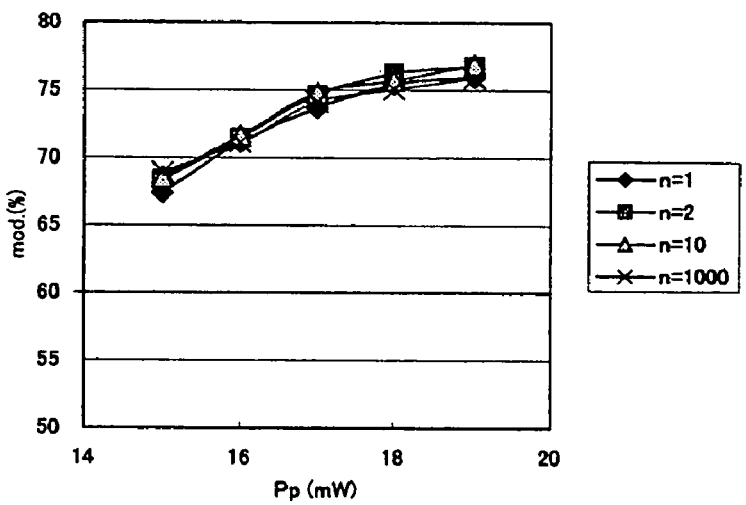
Figure 11C:
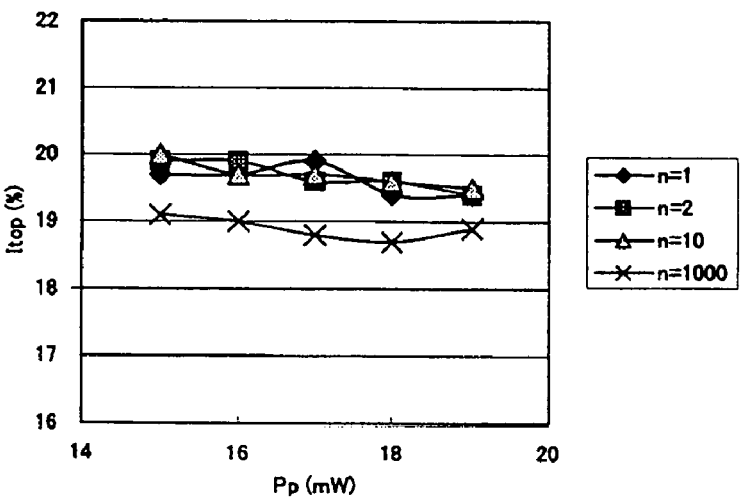

FIGS. 11A, 11B, and 11C show the recording properties at 4× speed and show changes in σ/Tw (jitter), in mod. (modulation factor) and in Itop, respectively. The numeral n in the figures is the number of recording cycles.

FIG. 11A shows that the jitter is about 9% or less at a Pp ranging from 16 mW to 18 mW even after 1000 repeated cycles of recording, and the disc has satisfactory recording repeatability. FIG. 11C shows that the reflectance changes little between the first cycle of recording and the ten cycles of recording.

Figure 12A:
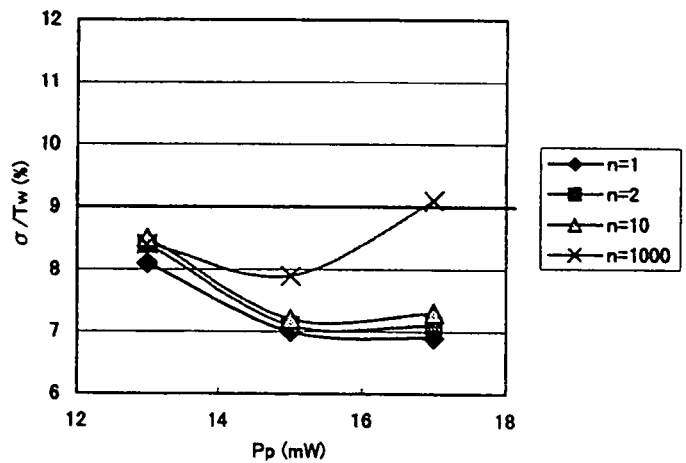
Figure 12B:
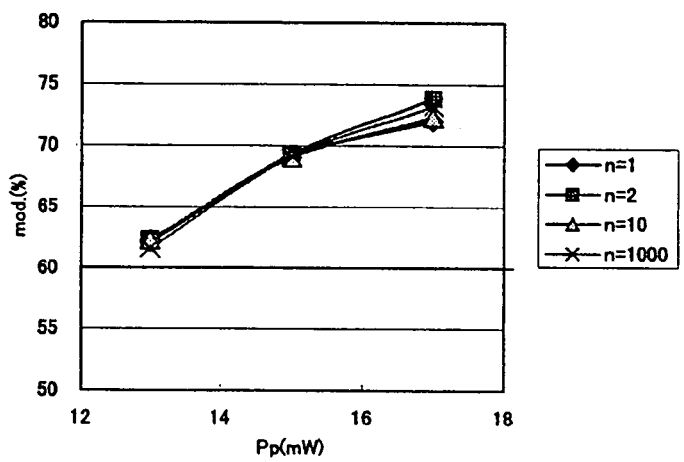
Figure 12C:
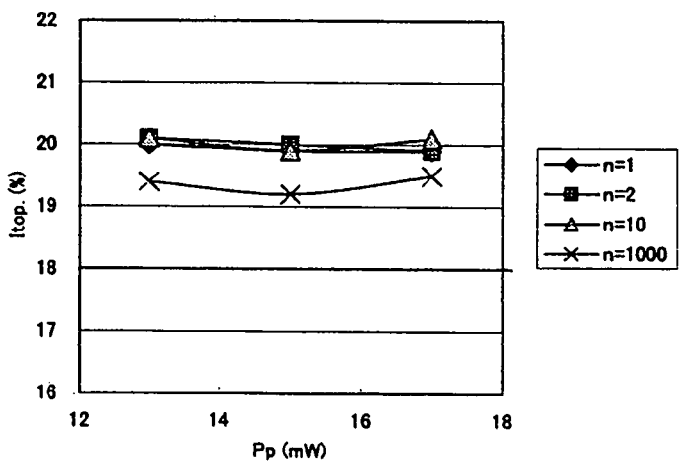

FIGS. 12A, 12B, and 12C show the recording properties at 4× speed and show changes in σ/Tw (jitter), in mod. (modulation factor) and in Itop, respectively. The numeral n in the figures is the number of recording cycles.

FIGS. 12A and 12B show that the optical recording medium being recordable at 4× speed has satisfactory jitter and modulation properties even in recording at low linear velocity with a Pb of 15 mW or less and has good downward compatibility.

The recording repeatability of the disc at 4× speed was evaluated again 2 weeks after the initialization and was found that the difference between the jitters was 0.5% or less. In addition, the disc was subjected to an archival test at 80° C. and 85% relative humidity (RH) for the evaluation of archival properties and was found to exhibit substantially no deterioration in archival properties even after 400-hour archive.

EXAMPLE A-2

A disc having a lower protective layer, a lower interfacial layer, a recording layer, an upper protective layer, a sulfuration-inhibiting layer, and a reflective layer arranged on the substrate in this order was used. The lower protective layer comprised 80 mol % of ZnS and 20 mol % of $SiO_2$ and had a thickness of 63 nm. The lower interfacial layer was arranged between the recording layer and the lower protective layer, comprised 80 mol % of ($ZrO_2$-3 mol % $Y_2O_3$) and 20 mol % of $TiO_2$ and had a thickness of 2 nm. The recording layer had a composition of $Ag_{0.7}In_{2.6}Sb_{71.5}Te_{20.9}Ge_{4.3}$ and had a thickness of 15 nm. The upper protective layer comprised 80 mol % of ZnS and 20 mol % of $SiO_2$ and had a thickness of 12 nm. The sulfuration-inhibiting layer comprised Si and had a thickness of 4 nm. The reflective layer comprised Ag and had a thickness of 140 nm.

The disc was initialized at a power of 1200 mW, a linear velocity of 9 m/s and a feed speed of 20 μm/r.

In this procedure, the reflectance of an unrecorded area was 20.1%. The transition linear velocity was 9.5 m/s as determined by applying continuous light of 11 mW.

Figure 13:
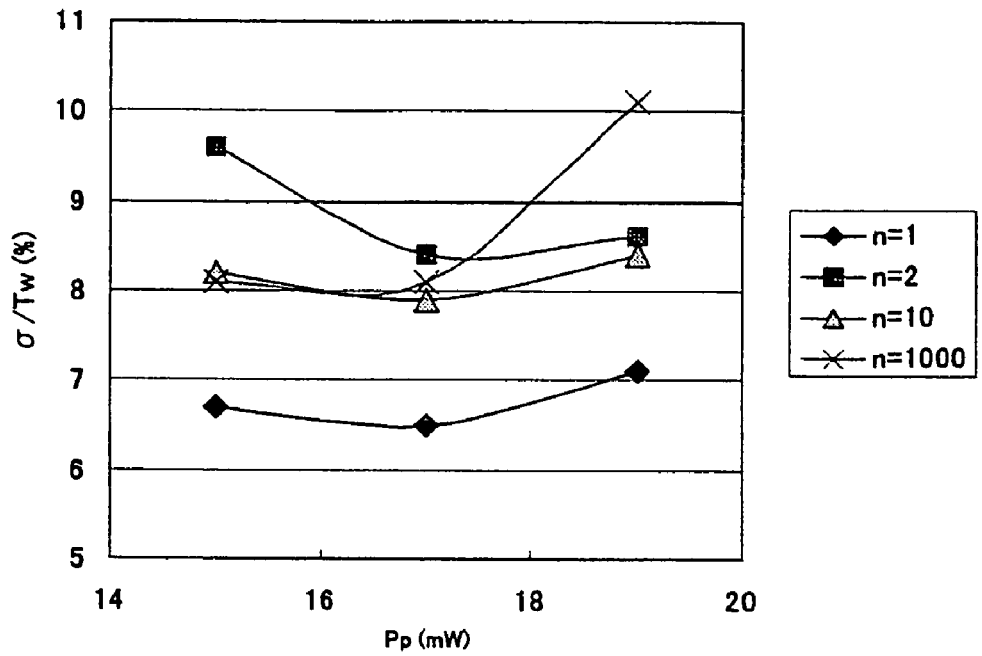
FIG. 13 is a graph showing the jitter of an optical recording medium according to Example A-2 in recording at 4× speed.

FIG. 13 shows the jitters in recording at 4× speed, demonstrating that results similar to those in Example A-1 were obtained in Example A-2. In recording at 2.4× speed, similar results to those in Example A-1 were also obtained, indicating that the optical recording medium of the present example can be recorded at 4× speed and also has good downward compatibility.

The recording repeatability of the disc at 4× speed was evaluated again 2 weeks after the initialization and was found that the difference between the jitters was 0.5% or less. In addition, the disc was subjected to an archival test at 80° C. and 85% relative humidity (RH) for the evaluation of archival properties and was found to exhibit substantially no deterioration in archival properties even after 400-hour archive.

EXAMPLE A-3

A disc having a lower protective layer, a lower interfacial layer, a recording layer, an upper interfacial layer, an upper protective layer, a sulfuration-inhibiting layer, and a reflective layer arranged on the substrate in this order was used. The lower protective layer comprised 80 mol % of ZnS and 20 mol % of $SiO_2$ and had a thickness of 63 nm. The lower interfacial layer was arranged between the recording layer and the lower protective layer, comprised 80 mol % of ($ZrO_2$-3 mol % $Y_2O_3$) and 20 mol % of $TiO_2$ and had a thickness of 2 nm. The recording layer had a composition of $Ag_{0.7}In_{2.6}Sb_{71.5}Te_{20.9}Ge_{4.3}$ and had a thickness of 15 nm. The upper interfacial layer was arranged between the recording layer and the upper protective layer, comprised 80 mol % of ($ZrO_2$-3 mol % $Y_2O_3$) and 20 mol % of $TiO_2$ and had a thickness of 2 nm. The upper protective layer comprised 80 mol % of ZnS and 20 mol % of $SiO_2$ and had a thickness of 10 nm. The sulfuration-inhibiting layer comprised Si and had a thickness of 4 nm. The reflective layer comprised Ag and had a thickness of 140 nm.

The disc was initialized at a power of 1200 mW, a linear velocity of 9 m/s and a feed speed of 20 μm/r.

In this procedure, the reflectance of an unrecorded area was 20.1%. The transition linear velocity was 9.5 m/s as determined by applying continuous light of 11 mW.

FIG. 13 shows the jitters in recording at 4× speed and shows that the disc of Example A-3 exhibited results similar to those in Examples A-1 and A-2 in ten cycles of recording but exhibited better recording properties than Examples A-1 and A-2 in further repeated cycles of recording. This disc showed similar results after 1000 repeated cycles of recording to those of its first recording.

The jitter of the disc raised little in recording at 2.4× speed even after 1000 repeated cycles of recording, indicating that the disc had better recording properties than Examples A-1 and A-2. The disc of Example A-3 is an optical recording medium for use in recording at 4× speed and has good downward compatibility.

The recording repeatability of the disc at 4× speed was evaluated again 2 weeks after the initialization and was found that the difference between the jitters was 0.5% or less. The disc was subjected to an archival test at 80° C. and 85% relative humidity (RH) for the evaluation of archival properties. A mark after 1000 repeated cycles of recording had a jitter exceeding 9% 100 hours into the test, and a mark after 100 repeated cycles of recording had a jitter exceeding 9% 300 hours into the test. Marks after 1 to 10 repeated cycles of recording showed little deterioration even 400 hours into the test.

EXAMPLE A-4

A disc having a lower protective layer, a lower interfacial layer, a recording layer, an upper protective layer, a sulfuration-inhibiting layer, and a reflective layer arranged on the substrate in this order was used. The lower protective layer comprised 80 mol % of ZnS and 20 mol % of $SiO_2$ and had a thickness of 63 nm. The lower interfacial layer was arranged between the recording layer and the lower protective layer, comprised $Al_2O_3$ and had a thickness of 2 nm. The recording layer had a composition of $Ag_{0.7}In_{20.6}Sb_{71.5}Te_{20.9}Ge_{4.3}$ and had a thickness of 15 nm. The upper protective layer comprised 80 mol % of ZnS and 20 mol % of $SiO_2$ and had a thickness of 12 nm. The sulfuration-inhibiting layer comprised Si and had a thickness of 4 nm. The reflective layer comprised Ag and had a thickness of 140 nm.

The disc was initialized at a power of 1200 mW, a linear velocity of 9 m/s and a feed speed of 20 μm/r.

In this procedure, the reflectance of an unrecorded area was 20.3%. The transition linear velocity was 9.6 m/s as determined by applying continuous light of 11 mW.

Figure 14:
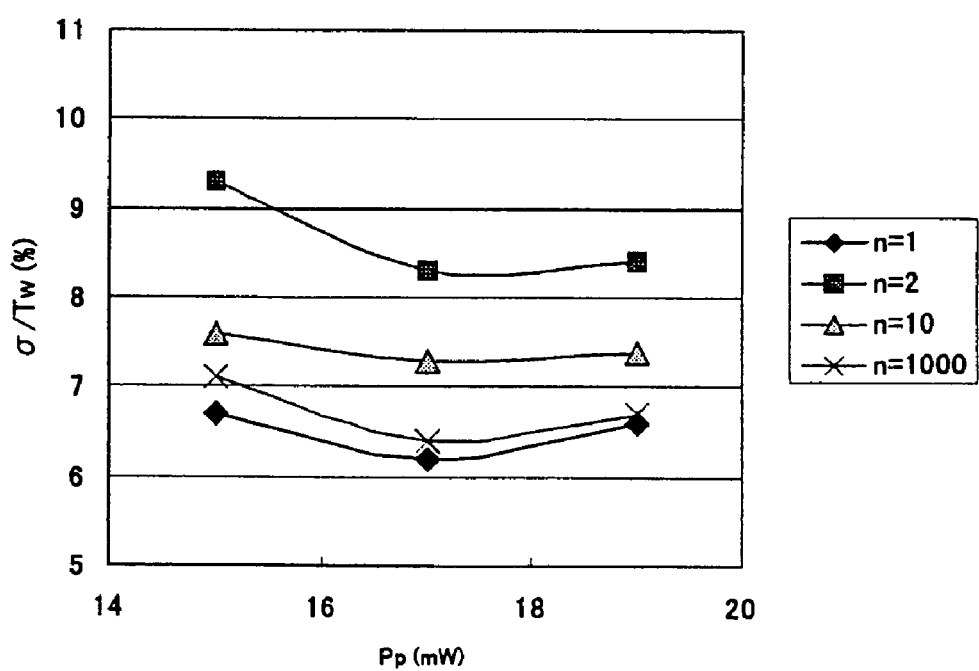
FIG. 14 is a graph showing the jitter of an optical recording medium according to Example A-3 in recording at 4× speed.
Figure 15:
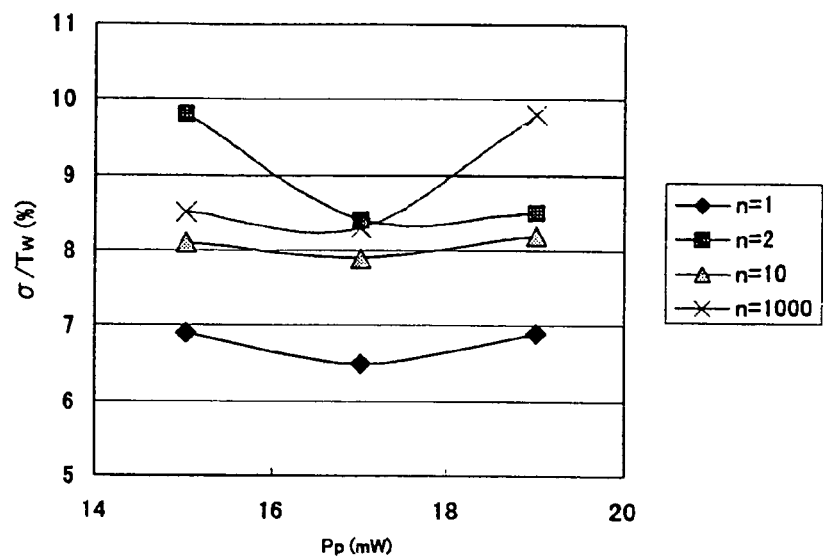
FIG. 15 is a graph showing the jitter of an optical recording medium according to Example A-4 in recording at 4× speed.

FIG. 14 shows the jitters in recording at 4× speed, demonstrating that results similar to those in Examples A-1 and A-2 were obtained in Example A-4. In recording at 2.4× speed, similar results to those in Example A-1 were also obtained, indicating that the optical recording medium of the present example can be recorded at 4× speed and also has good downward compatibility.

The recording repeatability of the disc at 4× speed was evaluated again 2 weeks after the initialization and was found that the difference between the jitters was 0.5% or less. In addition, the disc was subjected to an archival test at 80° C. and 85% relative humidity (RH) for the evaluation of archival properties and was found to exhibit substantially no deterioration in archival properties even after 400-hour archive.

COMPARATIVE EXAMPLE A-1

An optical recording medium was prepared, initialized and evaluated by the procedure of Example A-1, except that the initialization was performed at a power of 600 mW. The reflectance of an unrecorded area was 16.3%.

Figure 16:
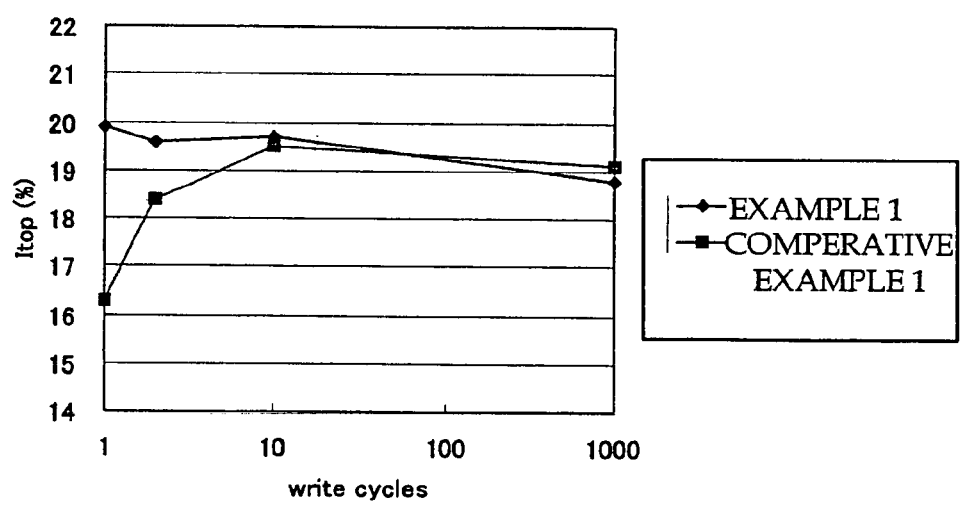
FIG. 16 is a graph showing changes in Itop in recording on the optical recording media according to Example A-1 and Comparative Example A-1 multiple times at 4× speed at a Pb of 17 mW.

The change in Itop of the optical recording medium in recording at 4× speed at a power Pb of 17 mW is shown in FIG. 16 together with the result of Example A-1. FIG. 16 shows that, Itop increases by 3% or more after 10 repeated cycles of recording in the optical recording medium of Comparative Example A-1.

Figure 17:
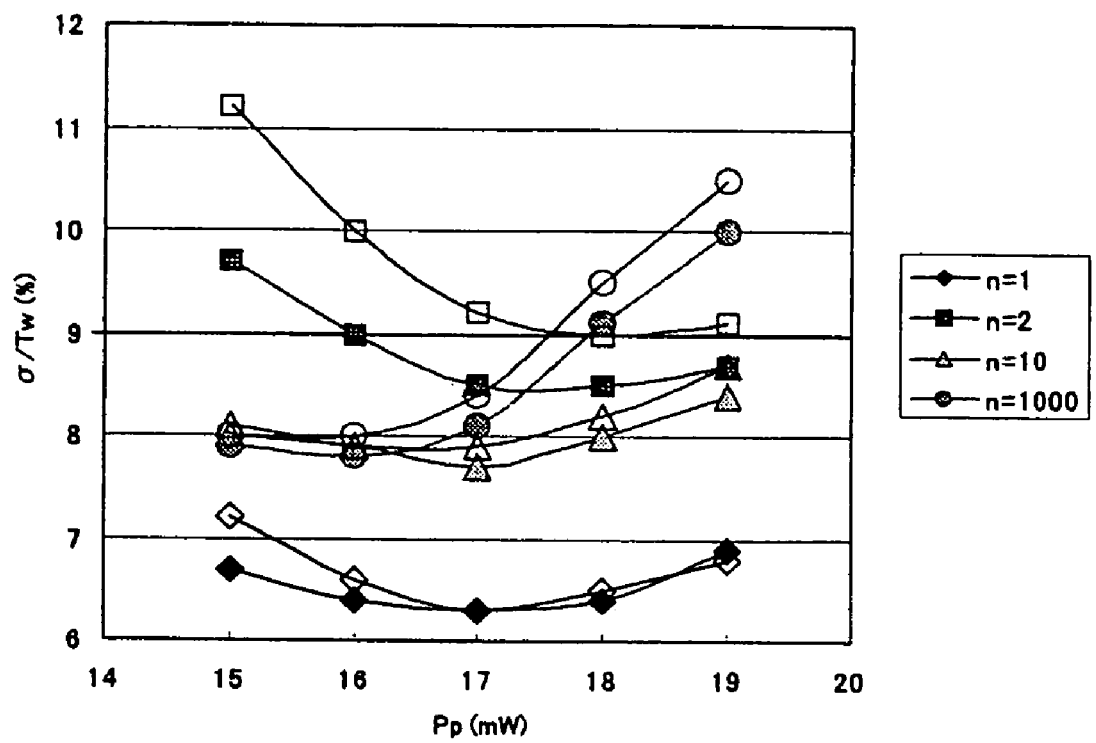
FIG. 17 is a graph showing the jitter of the optical recording medium according to Comparative Example A-1 in recording at 4× speed immediately after initialization and the jitter in an unrecorded area thereof in repeated cycles of recording at 4× speed two weeks after the initialization.

FIG. 17 is a graph showing the jitter of the optical recording medium according to Comparative Example A-1 in recording at 4× speed immediately after initialization and the jitter thereof in an unrecorded area after repeated cycles of recording at 4× speed two weeks after the initialization. Open symbols in the figure represent results in repeated cycles of recording two weeks after the initialization. The initial properties of the disc are satisfactory as in those of Example A-1. However, two weeks after the initialization, the jitter increases especially after two repeated cycles of recording.

In recording at 2.4× speed, some deterioration was observed in the jitter properties but was trivial. EXAMPLES B-1, B-2, B-3, B-4, B-5, B-6, B-7, B-8, AND B-9, COMPARATIVE EXAMPLES B-1, B-2, B-3, B-4, B-5, B-6, AND B-7

Figure 18:
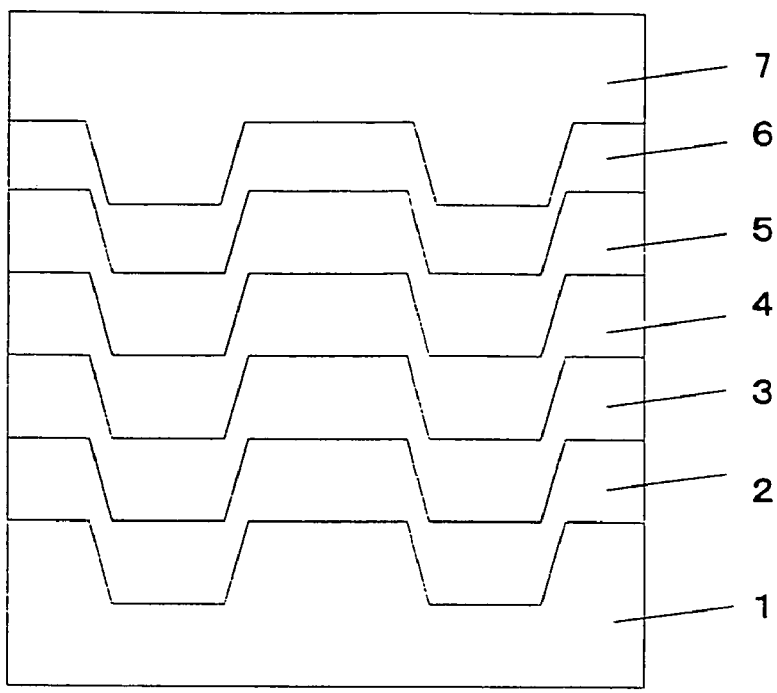
FIG. 18 is a schematic diagram of a layer configuration of an optical recording medium prepared in the examples.

A series of optical recording media (optical discs) having the configuration shown in FIG. 18 was prepared in the following manner.

A polycarbonate substrate 1 having a diameter of 120 mm and a thickness of 0.6 mm was used. The substrate had a groove having a track pitch of 0.74 μm, a groove (depression) width of 0.3 μm, and a groove depth of about 30 nm.

On the substrate were formed a lower protective layer 2, a recording layer 3, an upper protective layer, a sulfuration-inhibiting layer 4, and a reflective layer 5 in this order. The lower protective layer comprised ZnS and $SiO_2$, was formed at a film forming rate of 9 nm/s and had a thickness of 55 nm. The recording layer comprised any one of the phase-change materials shown in Table 2, was formed at a film forming rate of 7 nm/s and had a thickness of 11 nm. The upper protective layer comprised ZnS and $SiO_2$, was formed at a film forming rate of 3 nm/s and had a thickness of 11 nm. The sulfuration-inhibiting layer comprised SiC, was formed at a film forming rate of 1 nm/s and had a thickness of 4 nm. The reflective layer comprised Ag, was formed at a film forming rate of 35 nm/s and had a thickness of 140 nm.

The sulfuration-inhibiting layer was arranged so as to prevent the reaction between Ag in the reflective layer and ZnS—$SiO_2$ in the upper protective layer. In this procedure, the ZnS—$SiO_2$ films were formed by RF magnetron sputtering, and the recording layer, SiC layer, and Ag layer were formed by DC magnetron sputtering.

An UV curable resin SD-318 (trade name, a product of Dainippon Ink and Chemicals, Inc., Japan) was applied on the reflective layer and thereby yielded an organic protective film 6.

Another substrate (not sown) 7 having the same configuration as above was disposed to the organic protective film and thereby yielded an optical disc having a thickness of about 1.2 mm.

The above-prepared optical disc (optical recording medium) was initialized under conditions shown in Table 2 using an initialization apparatus POP120-7AH (trade name, available from Hitachi, Ltd.) having a laser head with focusing function, which is capable of emitting laser light of an output wavelength of 830 nm, a width of about 1 μm, a length of about 75 μm, and an maximum output of about 2W.

TABLE 2

| | Phase change material | Recrystallization critical velocity (m/s) | Initialization linear velocity (m/s) | Initialization power (mW) |
|---|---|---|---|---|
| <Comp. Ex. B-1> | Ag0.021In0.014Sb0.712Te0.212Ge0.041 | 9.0 | 9.5 | 1000 |
| <Example B-1> | Ag0.006In0.016Sb0.723Te0.213Ge0.042 | 9.5 | 10.0 | 1100 |
| <Example B-2> | Ag0.006In0.026Sb0.715Te0.211Ge0.042 | 9.8 | 10.5 | 1200 |
| <Example B-3> | Ag0.002In0.035Sb0.714Te0.214Ge0.035 | 10.2 | 10.5 | 1200 |
| <Example B-4> | In0.03Sb0.710Te0.220Ge0.040 | 9.6 | 10.0 | 1200 |
| <Comp. Ex. B-2> | Ag0.007In0.040Sb0.706Te0.203Ge0.044 | 10.5 | 11.0 | 1300 |

Note)
Numerical values of phase-change material refer to atomic ratios.

The recording repeatability (DOW properties) of each of the above-prepared optical discs was determined. Specifically, a record was produced on adjacent five tracks at a constant disc rotational linear velocity of 14 m/s using an optical disc evaluation machine DDU-1000 (trade name, available from Pulstec Industrial Co., Ltd., Japan) and the record on the central track was reproduced. The record was produced on the groove in a pulse modulation process according to an EFM plus [8/16(2,10)RLL] modulation system at a recording density of 0.267 μm/bit. An optimized peak power Pp was used. The erasing power Pe was set so that the ratio of Pp to Pe is 0.31. The bias power was set constant at 0.1 mW.

The data to clock jitter of the recorded signals was measured, and the jitter σ/Tw, wherein Tw is a window width, was evaluated. Changes in the jitter of each optical disc after one cycle of recording, two cycles of recording, ten cycles of recording and hundred cycles of recording were determined. The quality of the sample disc was evaluated whether or not the jitter is 9% or less according to the specifications for DVD+RW media.

Figure 19:
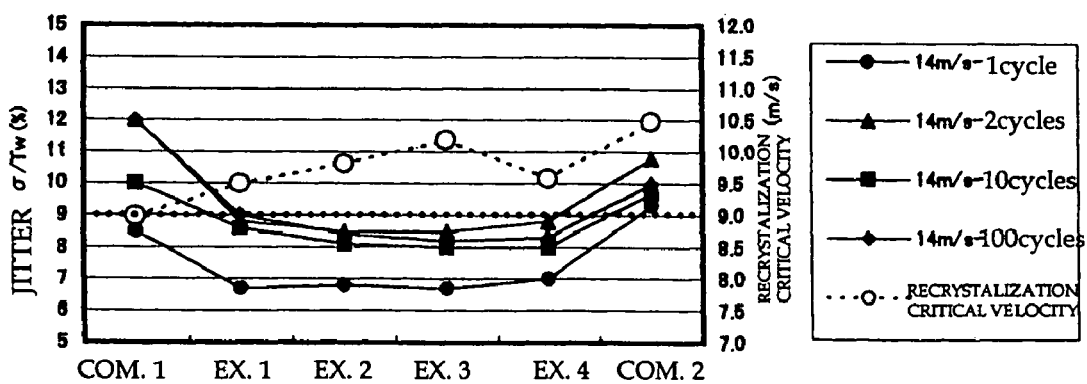
FIG. 19 is a diagram showing changes in jitters of optical recording media according to Examples B-1, B-2, B-3, and B-4, and Comparative Examples B-1 and B-2 in 1 cycle, 2 cycles, 10 cycles, and 100 cycles of recording at a medium rotational linear velocity of 14 m/s.

The results are shown in FIG. 19. FIG. 19 shows that the optical disc of Comparative Example B-1 exhibits a jitter exceeding 9% and is out of the specifications. The optical disc of Example B-4 has a peak power Pp (recording power) 1.5 mW higher than those of the optical discs of Examples B-1, B-2, and B-3.

Figure 20:
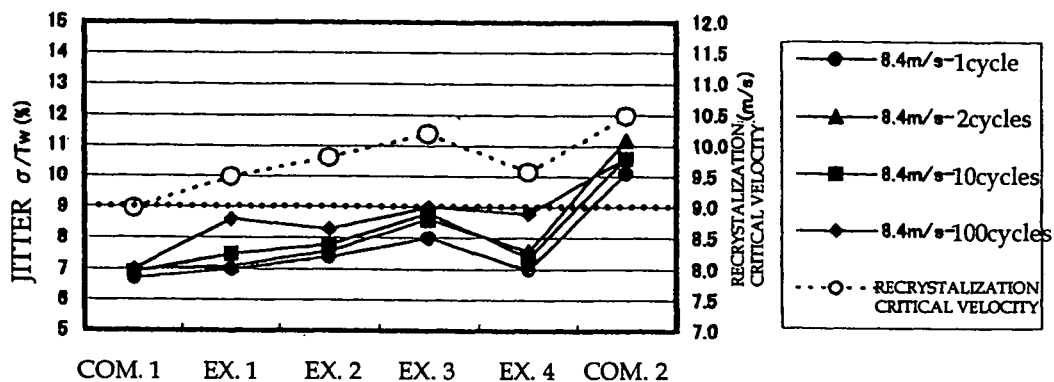
FIG. 20 is a diagram of changes in jitters of optical recording media according to Examples B-1, B-2, B-3, and B-4, and Comparative Examples B-1 and B-2 in 1 cycle, 2 cycles, 10 cycles, and 100 cycles of recording at a medium rotational linear velocity of 8.4 m/s.

Next, a record was produced at the highest recording linear velocity, 8.4 m/s, employed in present DVD+RW media. The results are shown in FIG. 20, demonstrating that the disc of Comparative Example B-2 exhibits a jitter exceeding 9% and is out of the specification.

On the sensitivity of recording power in recording at a linear velocity of 8.4 m/s, the optical discs of Examples B-1 and B-2 exhibit a jitter of 9% or less at a recording power of 13 mW or higher. In contrast, the optical discs of Examples B-3 and B-4 exhibit a jitter of 9% or less at a recording power of 14 mW or higher, and at a recording power of 15 mW or higher, respectively. These results show that the optical discs of Examples B-1 and B-2 have better recording sensitivity and better downward compatibility.

These results show that optical discs having the configurations of the present invention can have satisfactory downward compatibility and can be recorded at high linear velocity.

Next, a correspondence of the disk to a CAV recording system was monitored as follow.

When a recording area on the disk is in a range of 24 mm to 58 mm in a radius direction of the disk, in the case that the innermost circumference is rotated with DVD media reference linear velocity, i.e., 3.5 m/s, a revolution of the disk is about 1,400 rpm. Here, a linear velocity of the outermost circumference is about 8.4 m/s. The CVA recording system using this revolution refers to CAV1X. In this case, a linear velocity at the area of 44 mm, i.e., an intermediate circumference, is 5.95 m/s.

In the case that the innermost circumference is rotated at 14 m/s on the range of the above-mentioned recording area, a revolution of the disk is about 2,300 rpm. Here, a linear velocity of the outermost circumference is about 5.8 m/s. The CVA recording system using this revolution refers to CAV1.6X as it is 1.6 times of CAV1X. In this case, a linear velocity at 41 mm, i.e., an intermediate circumference, is 9.9 m/s.

To realize recording with CAV1X and CAV1.6X, it is necessary to perform a recording with linear velocities of, at least, 3.5 m/s, 5.8 m/s, 5.95 m/s. 8.4 m/s, 9.9 m/s and 14 m/s. However, linear velocities according to the above CAV recording systems at the intermediate circumference have a deference of only lm/s to 1.5 m/s comparing the maximum linear velocity of CAV1X with the minimum linear velocity of CAV1.6X. Accordingly, evaluation of recording with CAV1X and CAV1.6X were conducted by evaluating the disks of Example B-1 through B-4 in recording at 3.5 m/s and 5.8 m/s which were the linear velocities not evaluated in the above Example B-1 through B-4. Here, in the same manner of the case of the linear velocity of 8.4 m/s, an upper limit of Pp was set to 16 mW with considering a recording sensitivity. The erasing power Pe was adjusted so as to satisfy the relation of: Pp/Pe=0.5.

Figure 21:
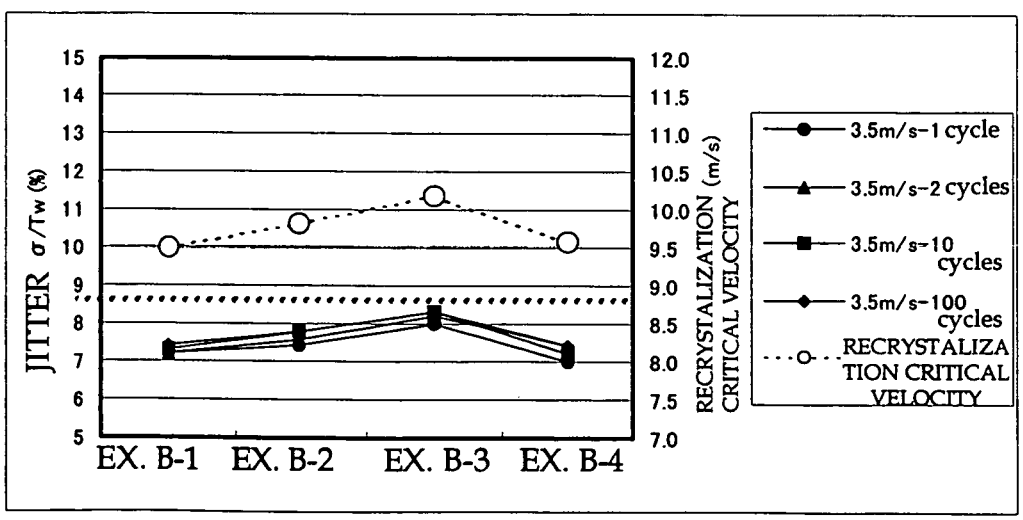
FIG. 21 is a diagram of changes in jitters of optical recording media according to Examples B-1, B-2, B-3, and B-4 in 1 cycle, 2 cycles, 10 cycles, and 100 cycles of recording with CAV1X.
Figure 22:
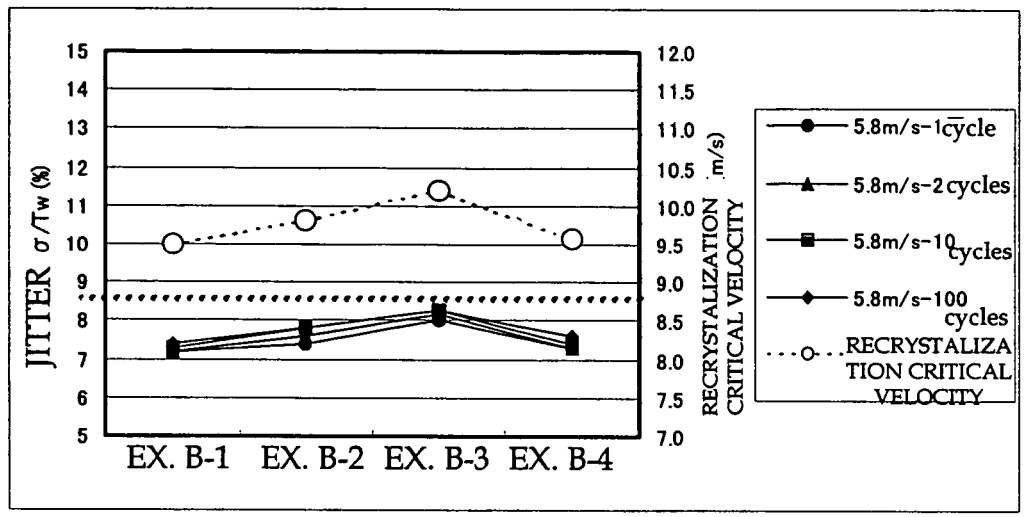
FIG. 22 is a diagram of changes in jitters of optical recording media according to Examples B-1, B-2, B-3, and B-4 in 1 cycle, 2 cycles, 10 cycles, and 100 cycles of recording with CAV1.6X.

Evaluated results thereof are shown in FIGS. 21 and 22. As found in these figures, the disks of the present examples show excellent results with the linear velocities of 3.5 m/s and 5.8 m/s, thus it is possible to perform a recording of CAV1X and CAV1.6X.

Next, in the same manner of Example As (the results of Example A-1 and Comparative Example A-1), a difference of reflectance ΔR between an unrecorded area of the disk and the disk after 10 cycles of recording with the recording of 4× was measured. The results are shown in Table 3. As shown with the results, ΔR of the disks of the present examples are 3% or less. Thus, it is found that jitter properties of the disks of the present examples do not deteriorate with time as well as Example A-1.

TABLE 3

| | ΔR (%) |
|---|---|
| Example B-1 | 0.8 |
| Example B-2 | 0.6 |
| Example B-3 | 0.3 |
| Example B-4 | 1.0 |

Next, the procedure of Example B-1 was repeated except that phase-change materials having the same recrystallization critical velocity as the phase-change material used in Example B-3 but having different amounts of Ag, In, and Ge as shown in Table 4 were used.

TABLE 4

| | Phase change material | Ag + In + Ge |
|---|---|---|
| <Comp. Ex. B-3> | Ag0.001In0.021Sb0.734Te0.216Ge0.028 | 0.050 |
| <Example B-5> | Ag0.001In0.020Sb0.731Te0.209Ge0.039 | 0.060 |
| <Example B-6> | Ag0.002In0.025Sb0.727Te0.208Ge0.038 | 0.065 |
| <Example B-3> | Ag0.002In0.035Sb0.714Te0.214Ge0.035 | 0.072 |
| <Example B-7> | Ag0.003In0.032Sb0.714Te0.211Ge0.040 | 0.075 |
| <Example B-8> | Ag0.004In0.034Sb0.710Te0.210Ge0.042 | 0.08 |
| <Comp. Ex. B-4> | Ag0.005In0.042Sb0.700Te0.208Ge0.045 | 0.092 |
| <Comp. Ex. B-5> | Ag0.020In0.040Sb0.695Te0.203Ge0.042 | 0.102 |

Note)
Numerical values of phase-change material refer to atomic ratios.

Figure 23:
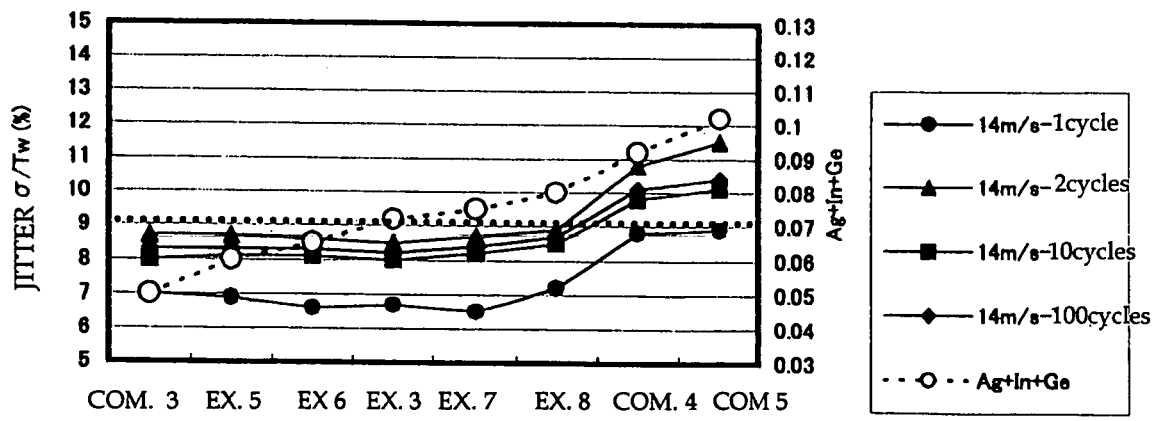
FIG. 23 is a diagram of changes in jitters of optical recording media according to Examples B-3, B-5, B-6, B-7, and B-8, and Comparative Examples B-3, B-4, and B-5 in 1 cycle, 2 cycles, 10 cycles, and 100 cycles of recording at a medium rotational linear velocity of 14 m/s.

Optical discs using the phase-change materials shown in Table 4 were prepared and properties thereof were evaluated in recording at a disc rotational linear velocity of 14 m/s by the procedure of Example B-1. The results are shown in FIG. 23, demonstrating that phase-change materials having a total amount of Ag, In, and Ge of less than 0.09 exhibit good results.

Figure 24:
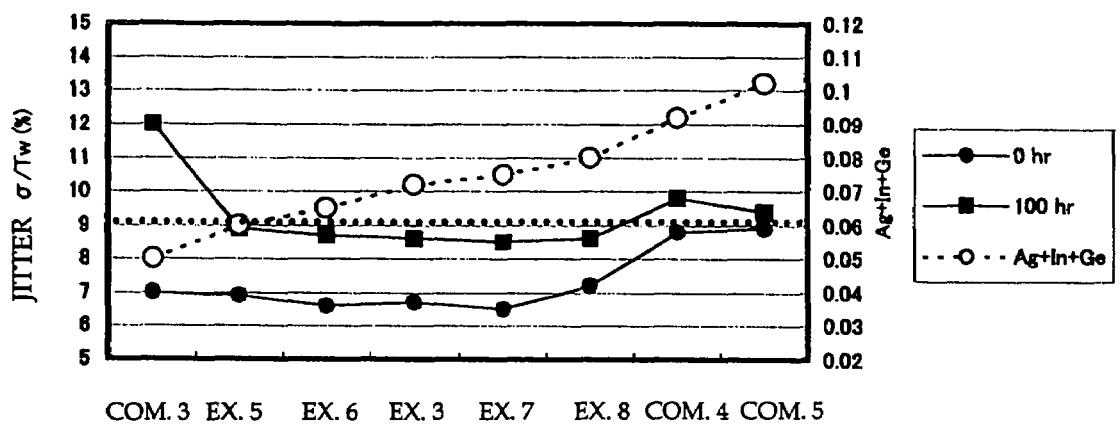
FIG. 24 is a diagram of changes in jitters of optical recording media according to Examples B-3, B-5, B-6, B-7, and B-8, and Comparative Examples B-3, B-4, and B-5 as determined by leaving the optical recording media once recorded at 80° C. and 85% relative humidity (RH) for 100 hours.

Next, a record was produced on each of the optical discs once by the above recording procedure, and the recorded discs were left stand at 80° C. at 85% RH for 100 hours. Then changes in the jitters were determined. The results are shown in FIG. 24, demonstrating that the jitter increases in an increasing degree with a decreasing total amount of Ag, In, and Ge. These results teach that the total amount of Ag, In, and Ge should be more than 0.05 for better reliability.

These results show that the optical discs having the configurations according to the present invention have excellent archival properties.

Next, the procedure of Example B-1 was repeated, except that phase-change materials having the same recrystallization critical velocity as the phase-change material used in Example B-3 but having different ratios [Ag/(Ag+In+Ge)] of Ag to the total amount of Ag, In, and Ge as shown in Table 5 were used.

TABLE 5

| | Phase change material | Ag/(Ag + In + Ge) |
|---|---|---|
| <Example B-3> | Ag0.002In0.035Sb0.714Te0.214Ge0.035 | 0.028 |
| <Example B-9> | Ag0.005In0.027Sb0.720Te0.210Ge0.038 | 0.071 |
| <Comp. Ex. B-6> | Ag0.007In0.028Sb0.720Te0.211Ge0.034 | 0.101 |
| <Comp. Ex. B-7> | Ag0.008In0.028Sb0.719Te0.210Ge0.035 | 0.113 |

Note)
Numerical values in the above table refer to atomic ratios.

Figure 25:
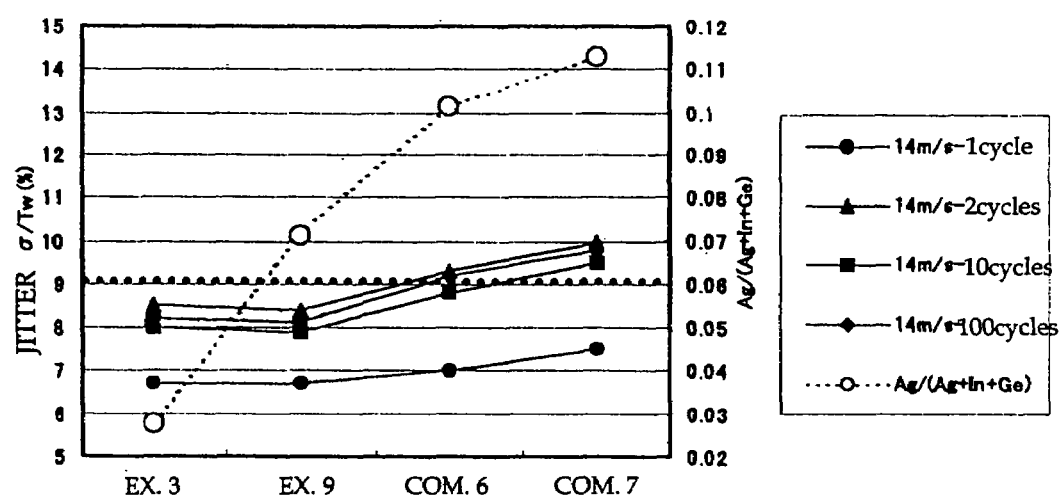
FIG. 25 is a diagram of changes in jitters of optical recording media according to Examples B-3 and B-9, and Comparative Examples B-6 and B-7 in 1 cycle, 2 cycles, 10 cycles, and 100 cycles of recording at a medium rotational linear velocity of 14 m/s.

Optical discs using these phase-change materials were prepared and properties thereof were evaluated in recording at a disc rotational linear velocity of 14 m/s by the procedure of Example B-1. The results are shown in FIG. 25, demonstrating that phase-change materials having a ratio [Ag/(Ag+In+Ge)] of Ag to the total amount of Ag, In, and Ge of 0.10 or less exhibit good results.

These results show that the optical discs having the configurations according to the present invention have improved recording properties at high linear velocity.

EXAMPLES B-10, B-11 AND B-12

Optical discs were prepared by the procedure of Example B-3, except that an oxide layer was additionally formed as shown in Table 6 in addition to the layer configuration of Example B-3. As the oxide layer, a film of $[(ZrP_2)_{0.97}(Y_2O_3)_{0.03}]_{0.8}(TiO_2)_{0.2}$ was formed by RF sputtering at a film forming rate of 1 nm/s to a thickness of 2 nm.

TABLE 6

| | Disc layer configuration |
|---|---|
| <Example B-3> | Lower protective layer/recording layer/upper protective layer/sulfuration-inhibiting layer/reflective layer |
| <Example B-10> | Lower protective layer/oxide layer/recording layer/upper protective layer/sulfuration-inhibiting layer/reflective layer |
| <Example B-11> | Lower protective layer/recording layer/oxide layer/upper protective layer/sulfuration-inhibiting layer/reflective layer |
| <Example B-12> | Lower protective layer/oxide layer/recording layer/oxide layer/upper protective layer/sulfuration-inhibiting layer/reflective layer |

Figure 26:
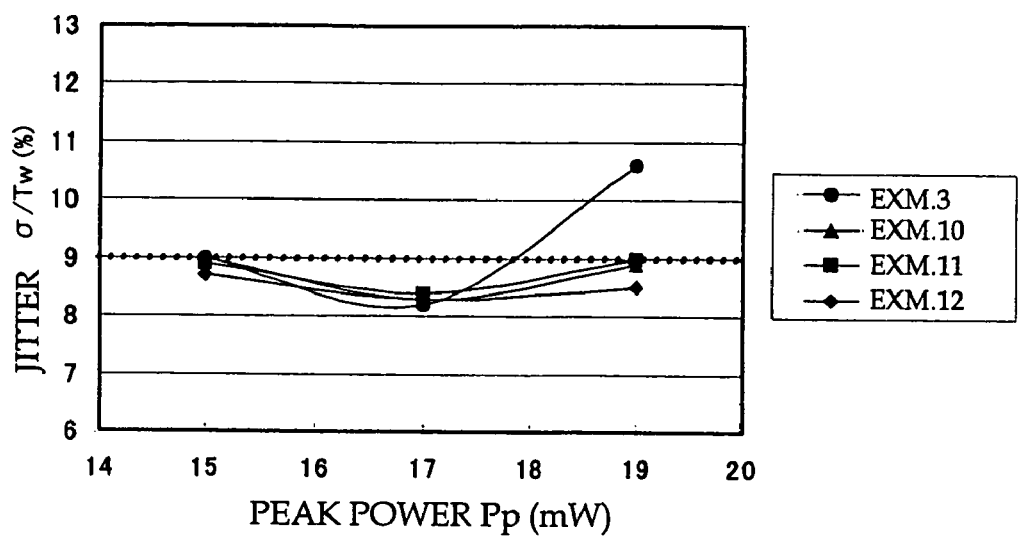
FIG. 26 is a diagram showing the relationship between the recording power and the jitter of optical recording media according to Examples B-3, B-10, B-11, and B-12 in 1000 cycles of recording at a medium rotational linear velocity of 14 m/s.

The properties of these optical discs in recording at a disc rotational linear velocity of 14 m/s were evaluated by the procedure of Example B-1, and the relationship between the recording power and the jitter after 1000 repeated cycles of recording was determined and was compared. The results are shown in FIG. 26, demonstrating that the jitter at higher power after 1000 repeated cycles of recording is improved by providing the oxide layer, and that more significant effects can be obtained by providing the oxide layer on both sides of the recording layer.

EXAMPLE B-13

Optical discs each having an oxide layer with a varying thickness in addition to the layer configuration of Example B-3 were prepared, and the relationship between the thickness of the oxide layer and the recording properties was determined. The thickness of the oxide layer was set at 0 nm (Example B-3), 1 nm, 2 nm, 4 nm, 5 nm, 6 nm, or 8 nm, and the jitters after 1000 repeated cycles of recording at a recording power of 19 mW were compared. The results are shown in FIG. 27.

Figure 27:
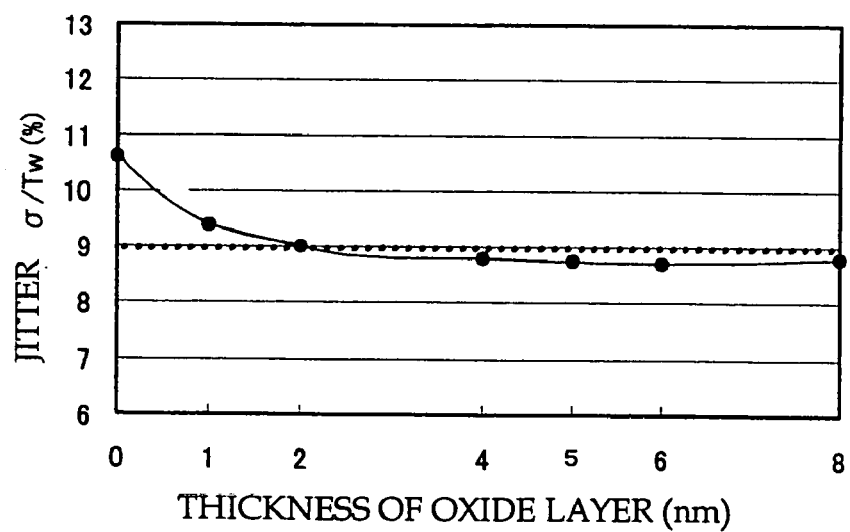
FIG. 27 is a diagram showing the relationship between the thickness of an oxide layer and the jitter in an optical recording medium according to Example B-13.

FIG. 27 demonstrates that the jitter is improved with an increasing thickness of the oxide layer and is significantly improved at a thickness of 2 nm or more. In FIG. 27, the jitter of the optical disc of Example B-3 is 10.6, but this jitter is obtained after 1000 repeated cycles of recording at a high recording power of 19 mW. The optical disc of Example B-3 exhibits a jitter of 9% or less under normal conditions as shown in FIGS. 19 and 20.

Next, a record was produced on each of the optical discs once at an optimum power by the recording procedure of Example B-1, and the recorded discs were left stand at 80° C. at 85% RH for 100 hours. Then changes in the jitters were determined. The results are shown in FIG. 28.

Figure 28:
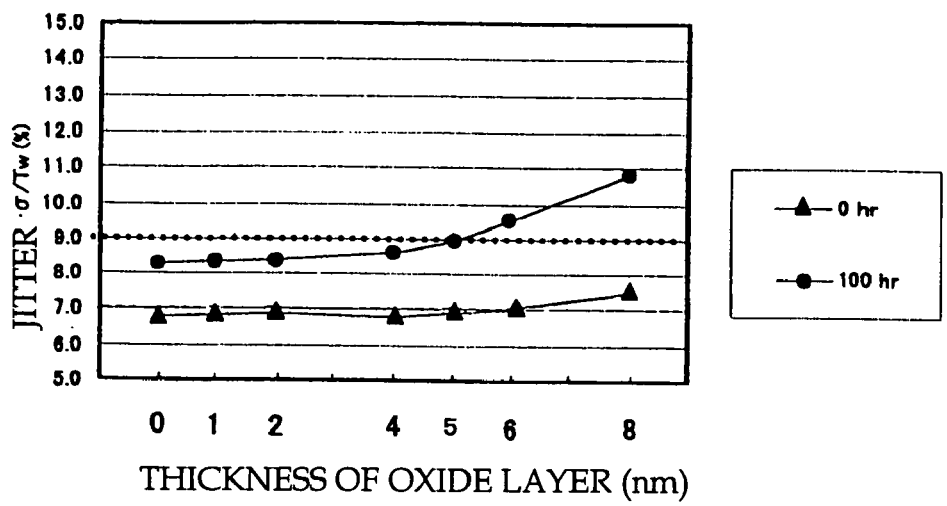
FIG. 28 a diagram of changes in jitter of the optical recording medium according to Example B-13 as determined by leasing the optical recording medium once recorded at 80° C. and 85% relative humidity (RH) for 100 hours.

FIG. 28 shows that the archival properties deteriorate at a thickness of the oxide layer of 6 nm or more. The influence of the thickness of the oxide layer does not depend on the location of the oxide layer. Specifically, similar effects as in the optical disc of Example B-13 having an oxide layer 2 nm thick are obtained in the optical discs of Examples B-10 and B-12 when the thickness of the oxide layer was set at 2 nm.

EXAMPLE B-14

The relationship between the amount of $TiO_2$ in the oxide layer and the recording properties was determined on the optical disc of Example B-13 having the oxide layer 2 nm thick. Specifically, optical discs having the configuration of Example B-13 and having an oxide layer comprising 0 mol %, 10 mol %, 20 mol %, 40 mol %, 50 mol %, or 60 mol % of $TiO_2$ were prepared. The jitters of the optical discs were compared after 1000 repeated cycles of recording at a recording power of 19 mW. The results are shown in FIG. 29.

Figure 29:
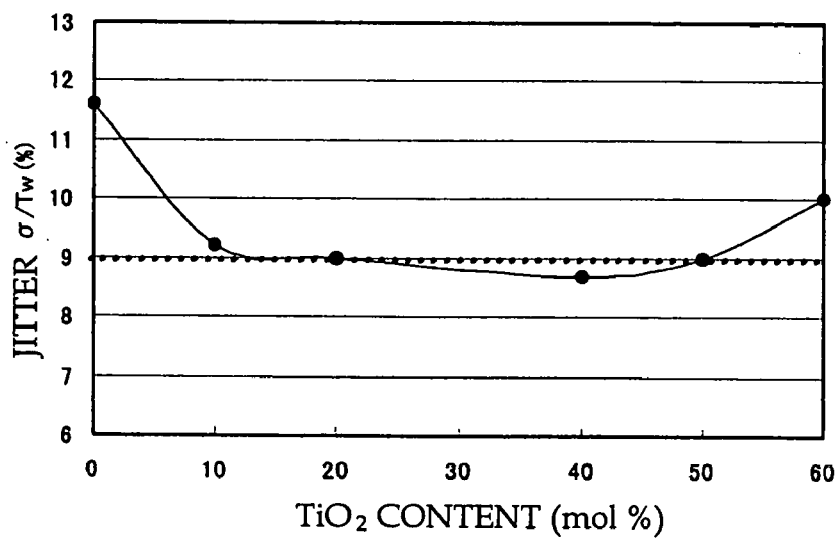
FIG. 29 is a diagram showing the relationship between the amount of $TiO_2$ and the jitter in the optical recording medium according to Example B-13 when its oxide layer has a thickness of 2 nm.

FIG. 29 demonstrates that the jitter properties are not sufficiently improved at a $TiO_2$ amount of less than 10 mol % or of more than 50 mol %. In this connection, the influence of the $TiO_2$ amount does not depend on the location of the oxide layer, and the optical discs of Examples B-10 and B-12 give similar results.

These results show that the optical discs having the configurations according to the present invention have improved recording properties in recording at high linear velocity such as DOW properties at higher power.

The present invention provides optical recording media which have high compatibility with DVD-ROM media, have excellent archival stability, can satisfactorily be recorded repeatedly at least at 4× speed (14 m/s) and can satisfactorily be recorded at 1× to 2.4× speed with a recording power of 15 mW or less in a recording pulse wave pattern using a multi-pulse in a cycle of 1T.

The present invention also provides optical recording media which have excellent DOW properties in high-velocity recording, can inhibit increased jitters in DOW1 and has excellent archival reliability. The present invention further provides optical recording media which have good downward compatibility, can be recorded over a broad range of linear velocities and can record both in a CAV system employed in conventional DVD+RW media and in a CAV system at higher velocity.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical recording medium comprising:
   a transparent substrate;
   a lower protective layer disposed above the transparent substrate;
   a recording layer containing a phase-change material, disposed above the lower protective layer;
   an upper protective layer disposed above the recording layer; and an interfacial layer disposed at least one of between the recording layer and the lower protective layer and between the recording layer and the upper protective layer; and a sulfuration-inhibiting layer formed over said upper protective layer, wherein the optical recording medium has a transition linear velocity ranging from 8 m/s to 11 m/s as determined by irradiating continuous light with a power of 11±1 mW and a wavelength of 660±10 nm using a pickup head with a numerical aperture (NA) of 0.65, and satisfies the following condition:

$$\Delta R = |Rb - Ra| \leq 3\%$$

where $\Delta R$ is an absolute value of the difference between Ra and Rb; Rb is a reflectance of an unrecorded area, and Ra is a reflectance of the top of an eye pattern after ten cycles of recording, and wherein the optical recording medium is recordable with at least two recording modes of a first recording mode and a second recording mode, in which the first recording mode is that the optical recording medium is rotated at a constant angular velocity so as to have a linear velocity of 3 m/s to 4 m/s when recording on an innermost track of the optical recording medium and to have a linear velocity of 8 m/s to 9 m/s when recording on an outermost track of the optical recording medium, and the second recording mode is that the optical recording medium is rotated at a constant angular velocity so as to have a linear velocity of 5 m/s to 6 m/s when recording on an innermost track of the optical recording medium and to have a linear velocity of 13 m/s to 14 m/s when recording on an outermost track of the optical recording medium.

2. An optical recording medium according to claim 1, wherein the lower protective layer has a thickness of 40 nm to 220 nm.

3. An optical recording medium according to claim 1, wherein the upper protective layer has a thickness of 2 nm to 20 nm.

4. An optical recording medium according to claim 1,
wherein the phase-change material in the recording layer has an atomic ratio [Sb/(Sb+Te)] of Sb to the total of Sb and Te of 0.74 to 0.85,
wherein the phase-change material further contains at least one of Ag, In, and Ge,
wherein the atomic ratio of the total of Ag, In, and Ge to the total atoms in the phase-change material is 0.04 to 0.10, and
wherein the atomic ratios of Ag, In, and Ge to the total atoms in the phase-change material satisfy the following conditions:

$$0 \leq Ag \leq 0.01, 0.02 \leq In \leq 0.06, \text{ and } 0.02 \leq Ge \leq 0.06.$$

5. An optical recording medium according to claim 1,
wherein the phase-change material in the recording layer has an atomic ratio [Sb/(Sb+Te)] of Sb to the total of Sb and Te of 0.74 to 0.79,
wherein the phase-change material further contains at least one of Ag, In, and Ge,
wherein the atomic ratio of the total of Ag, In, and Ge to the total atoms in the phase-change material is 0.04 to 0.10, and
wherein the atomic ratios of Ag, In, and Ge to the total atoms in the phase-change material satisfy the following conditions:

$$0 \leq Ag \leq 0.01, 0.02 \leq In \leq 0.06, \text{ and } 0.02 \leq Ge \leq 0.06.$$

6. An optical recording medium according to claim 1,
wherein the phase-change material in the recording layer further contains at least one of Ag, In, and Ge,
wherein the phase-change material has an atomic composition satisfying the following conditions;

$$0 \leq Ag \leq 0.015, 0.010 \leq In \leq 0.080, 0.600 \leq Sb \leq 0.800,$$
$$0.100 \leq Te \leq 0.300, \text{ and } 0.010 \leq Ge \leq 0.080,$$

wherein the atomic ratio of the total of Ag, In, and

Ge to the total atoms in the phase-change material is from 0.050 to 0.090, and wherein the atomic ratio [Ag/(Ag+ In+Ge)] of Ag to the total of Ag, In, and Ge in the phase-change material is 0.10 or less.

7. An optical recording medium according to claim 1, wherein the optical recording medium satisfies the following condition:

$$3.5 < [Rmaxv - RCv] < 5$$

where RCv is a recrystallization critical velocity (m/s) of the recording layer; and Rmaxv is a maximum recording linear velocity (m/s) of the recording layer.

8. An optical recording medium according to claim 1, wherein the recording layer has a thickness of 2 nm to 22 nm.

9. An optical recording medium according to claim 1, further comprising a reflective layer disposed above the sulfuration-inhibiting layer, wherein the reflective layer has a thickness of 90 nm to 200 nm.

10. An optical recording medium according to claim 1, wherein the sulfuration-inhibiting layer contains 90 mol% or more of Si and SiC.

11. An optical recording medium according to claim 1, wherein the interfacial layer contains at least one oxide selected from $ZrO_2$, $TiO_2$, $SiO_2$, $Al_2O_3$, and $Ta_2O_5$.

12. An optical recording medium according to claim 1, wherein the interfacial layer contains $ZrO_2$, $TiO_2$, and at least one selected from rare-earth metal oxides and oxides of Group IIa elements of the Periodic Table of Elements except Be and Ra.

13. An optical recording medium according to claim 12, wherein the at least one selected from rare-earth metal oxides and oxides of Group IIa elements of the Periodic Table of Elements except Be and Ra is contained in an amount of 1 mol % to 10 mol % relative to $ZrO_2$.

14. An optical recording medium according to claim 11, wherein $TiO_2$ is contained in the interfacial layer in an amount of 10 mol % to 50 mol % of the total oxides.

15. An optical recording medium according to claim 12, wherein $TiO_2$ is contained in the interfacial layer in an amount of 10 mol % to 50 mol % of the total oxides.

16. An optical recording medium according to claim 1, wherein the interfacial layer has a thickness of 1 nm to 22 nm.

17. An optical recording medium comprising:
a transparent substrate;
a lower protective layer disposed above the transparent substrate;
a recording layer containing a phase-change material, disposed above the lower protective layer;
an upper protective layer disposed above the recording layer;
an interfacial layer disposed at least one of between the recording layer and the lower protective layer and between the recording layer and the upper protective layer,
a sulfuration-inhibiting layer disposed above said upper protective layer;
wherein the optical recording medium has a transition linear velocity ranging from 8 m/s to 11 m/s as determined by irradiating continuous light with a power of 11±1 mW and a wavelength of 660±10 nm using a pickup head with a numerical aperture (NA) of 0.65, and satisfies the following condition:

$$\Delta R = |Rb - Ra| \leq 3\%$$

where $\Delta R$ is an absolute value of the difference between Ra and Rb; Rb is a reflectance of an unrecorded area, and Ra is a reflectance of the top of an eye pattern after ten cycles of recording, and wherein the optical recording medium is recordable with at least two recording modes of a first recording mode and a second recording mode, in which the first recording mode is that the optical recording medium is rotated at a constant angular velocity so as to have a linear velocity of 3 m/s to 4 m/s when recording on an innermost track of the optical recording medium and to have a linear velocity of 8 m/s to 9 m/s when recording on an outermost track of the optical recording medium, and the second recording mode is that the optical recording medium is rotated at a constant angular velocity so as to have a linear velocity of 5 m/s to 6 m/s when recording on an innermost track of the optical recording medium and to have a linear velocity of 13 m/s to 14 m/s when recording on an outermost track of the optical recording medium.

* * * * *